United States Patent
Tanaka et al.

(10) Patent No.: US 7,603,189 B2
(45) Date of Patent: Oct. 13, 2009

(54) APPARATUS, OPERATION TERMINAL, AND MONITORING METHOD OF APPARATUS

(75) Inventors: Kazuyoshi Tanaka, Hachioji (JP); Koji Kita, Machida (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 318 days.

(21) Appl. No.: 11/407,086

(22) Filed: Apr. 20, 2006

(65) Prior Publication Data

US 2006/0290680 A1 Dec. 28, 2006

(30) Foreign Application Priority Data

Jun. 27, 2005 (JP) ............... 2005-186563
Mar. 17, 2006 (JP) ............... 2006-074585

(51) Int. Cl.
*G06F 19/00* (2006.01)
*G06F 15/00* (2006.01)
*G06T 1/00* (2006.01)

(52) U.S. Cl. ............... 700/83; 700/17; 355/18; 358/400; 358/401; 358/406; 715/806

(58) Field of Classification Search ............ 700/17, 700/83; 355/18; 358/400–401, 406; 715/806
See application file for complete search history.

(56) References Cited

U.S. PATENT DOCUMENTS

| | | | | |
|---|---|---|---|---|
| 4,744,048 A | * | 5/1988 | Blanset et al. | 715/806 |
| 5,084,875 A | * | 1/1992 | Weinberger et al. | 714/46 |
| 5,537,554 A | * | 7/1996 | Motoyama | 710/100 |
| 5,657,478 A | | 8/1997 | Recker et al. | |
| 5,684,952 A | | 11/1997 | Stein | |
| 5,878,258 A | * | 3/1999 | Pizi et al. | 719/320 |
| 5,913,920 A | * | 6/1999 | Adams et al. | 709/204 |
| 5,995,771 A | * | 11/1999 | Miyawaki | 399/8 |
| 6,088,005 A | * | 7/2000 | Walls et al. | 345/4 |
| 6,130,757 A | | 10/2000 | Yoshida et al. | |
| 6,327,446 B1 | | 12/2001 | Suzuki | |
| 6,583,888 B1 | * | 6/2003 | Salgado et al. | 358/1.15 |
| 6,603,494 B1 | * | 8/2003 | Banks et al. | 715/807 |
| 7,272,793 B2 | * | 9/2007 | Mutsuno et al. | 715/707 |
| 2003/0028781 A1 | * | 2/2003 | Strongin | 713/182 |
| 2005/0027825 A1 | | 2/2005 | Hikawa et al. | |
| 2005/0117176 A1 | | 6/2005 | Benz et al. | |
| 2005/0200882 A9 | * | 9/2005 | Weinberger et al. | 358/1.15 |

(Continued)

FOREIGN PATENT DOCUMENTS

EP 0 943 986 9/1999

(Continued)

OTHER PUBLICATIONS

European Search Report dated Jun. 29, 2006 (EP 06 11 2777) (2 pages).

*Primary Examiner*—Michael D Masinick
(74) *Attorney, Agent, or Firm*—Finnegan, Henderson, Farabow, Garrett & Dunner, L.L.P.

(57) ABSTRACT

An apparatus including: a reception section to receive operation information from an operation terminal; a display section; and a controller that selectively executes a first control to display in the display section an operation screen corresponding to the operation information received by the reception section, and a second control not to display the operation screen.

11 Claims, 17 Drawing Sheets

U.S. PATENT DOCUMENTS

2005/0285714 A1* 12/2005 Hirose et al. ............... 340/3.54
2007/0209053 A1* 9/2007 Nathan ..................... 725/87

FOREIGN PATENT DOCUMENTS

| | | |
|---|---|---|
| EP | 1 011 259 | 6/2000 |
| JP | 5-122424 | 5/1993 |
| JP | 6-326797 | 11/1994 |

* cited by examiner

FIG. 17

SETTING EXAMPLE IN THE 4TH EMBODIMENT

| |
|---|
| USER SETTING LABEL 1: DEFAULT (MFP SERIAL NUMBER) |
| USER SETTING LABEL 2: DEFAULT (MFP IP ADDRESS |
| IP ADDRESS 1 IN MULTI MONITOR DISPLAY: DEFAULT (IP ADDRESS OF COPIER 100a) |
| IP ADDRESS 2 IN MULTI MONITOR DISPLAY: DEFAULT (IP ADDRESS OF COPIER 100b) |
| IP ADDRESS 3 IN MULTI MONITOR DISPLA: DEFAULT (IP ADDRESS OF COPIER 100c) |
| IP ADDRESS 4 IN MULTI MONITOR DISPLAY: DEFAULT (IP ADDRESS OF COPIER 100d) |
| IP ADDRESS 5 IN MULTI MONITOR DISPLAY: DEFAULT ( BLANK ) |

FIG. 18

REFERENTIAL TABLE OF STATUS & BACKGROUND COLOR

| STATUS | BACKGROUND COLOR |
|---|---|
| IDLING | GREEN |
| RUNNING | BLUE |
| JAM | YELLOW |
| SERVICEMAN CALL | RED |
| REMOTE | GREEN |
| WARMING UP | GREEN |
| CALIBRATION | GREEN |

APPARATUS, OPERATION TERMINAL, AND MONITORING METHOD OF APPARATUS

CROSS REFERENCE TO RELATED APPLICATION

The present application is based on Japanese Patent Application Nos. 2005-186563 and, 2006-074585 respectively filed on Jun. 27, 2005, and 2 Mar. 17, 2006 with Japanese Patent office.

BACKGROUND OF THE INVENTION

1. Technical Field

The present invention relates to apparatus that are targets of operation control, and to operation terminals that control the operations of such apparatus.

2. Description of Related Art

Conventionally, image forming apparatuses such as copying machines, facsimile apparatus, or printers have been known as operation target apparatus. In image forming apparatuses, various technologies have been proposed for improvement of convenience to users and of ease of operation. One typical of such technologies is an operation panel that is formed with the display device and a touch panel formed in an integral manner, and has been realized in a large number of image forming apparatuses. When the user operates the operation parts of the touch panel or of the operation keys, and changes the settings of the density or the contrast etc. during image forming, images are formed on the recording medium according to the details of those settings and recording sheet is output.

Further, systems have been proposed in which the image forming apparatus can be operated remotely via a network. In concrete terms, there is one proposed system in which the operation keys are displayed on a work station, and by transmitting via a network to the image forming apparatus the commands corresponding to the operation keys operated using a mouse cursor, the operations of that image forming apparatus is controlled remotely (see, for example, Unexamined Japanese Patent Application Publication No. Hei 6-326797), and there is another system in which the information of the coordinates of the position in the computer display at which the mouse was clicked is transmitted to the copying machine, and the operation is carried by the copying machine judging the operation instructed in the computer from the received coordinates information (see, for example Unexamined Japanese Patent Application Publication No. Hei 5-121424).

In systems such as the above, it is also possible to reflect in the display section of the image forming apparatus the contents of the operation instructions made in the remote operation terminal that carries out remote operation of the image forming apparatus. In this case, although it becomes possible to teach the method of operating the image forming apparatus to the user from a remote location, when carrying out operations that are to be carried out from a remote terminal only by maintenance personnel or system managers, there are times when the contents of such operations are not to be disclosed to the general users. In addition, while remote operation is being done from a remote operation terminal, if the user of the image forming apparatus makes operation inputs from the operation section of the image forming apparatus without knowing that it is currently being operated remotely, there will be the problem that the operation instructs conflict with each other.

SUMMARY

The present invention was made with the above problems in the conventional technology in view, and an object of the present invention is to provide an apparatus that can avoid, if and when necessary, the display of the contents of operations in the operation display of the apparatus when the operations are being made from an operation terminal.

Further, another object of the present invention is to provide an operation terminal that can know in the operation terminal the contents being displayed in actually in the apparatus that is the target of operation.

An apparatus according to an embodiment reflecting one aspect of the present invention to solve the above object includes: a reception section that receives operation information from an operation terminal; a display section; and a controller that selectively executes a first control to control the display section to display an operation screen corresponding to the operation information received by the reception section, and a second control to control the display section not to display the operation screen.

An operation terminal according to an embodiment reflecting another aspect of the present invention, connected to an apparatus provided with a first display section, for controlling the apparatus, the operation terminal including: a reception section which receives from the apparatus a first image corresponding to an image displayed in a first display section of the apparatus and a second image corresponding to an image of the operation screen for carrying out an operation of the apparatus; a second display section; and a controller which controls the second display section to display the first image and the second image.

A monitoring method, reflecting another aspect of the present invention, to monitor a plurality of image forming apparatuses from an operation terminal, including the steps of: registering a second image forming apparatus as a target of monitoring, among the plurality of image forming apparatuses, on a first image forming apparatus which functions as a server among the plurality of image forming apparatus; and providing, from the first image forming apparatus which functions as a server to the operation terminal, necessary information to monitor the second image forming apparatus as the target of monitoring.

BRIEF DESCRIPTION OF THE DRAWINGS

These and other objects, advantages and features of the invention will become apparent from the following description thereof taken in conjunction with the accompanying drawings in which:

FIG. 17 shows a setting example in the fourth preferred embodiment;

FIG. 18 shows an example of correspondence table between each status and the background color.

DETAILED DESCRIPTION OF THE PREFERRED EMBODIMENTS

First Preferred Embodiment

To begin with, referring to FIG. 1 to FIG. 6, an image forming system 1 according to a first preferred embodiment of the present invention is described below.

(Outline of Image Forming System 1)

Figure 1:
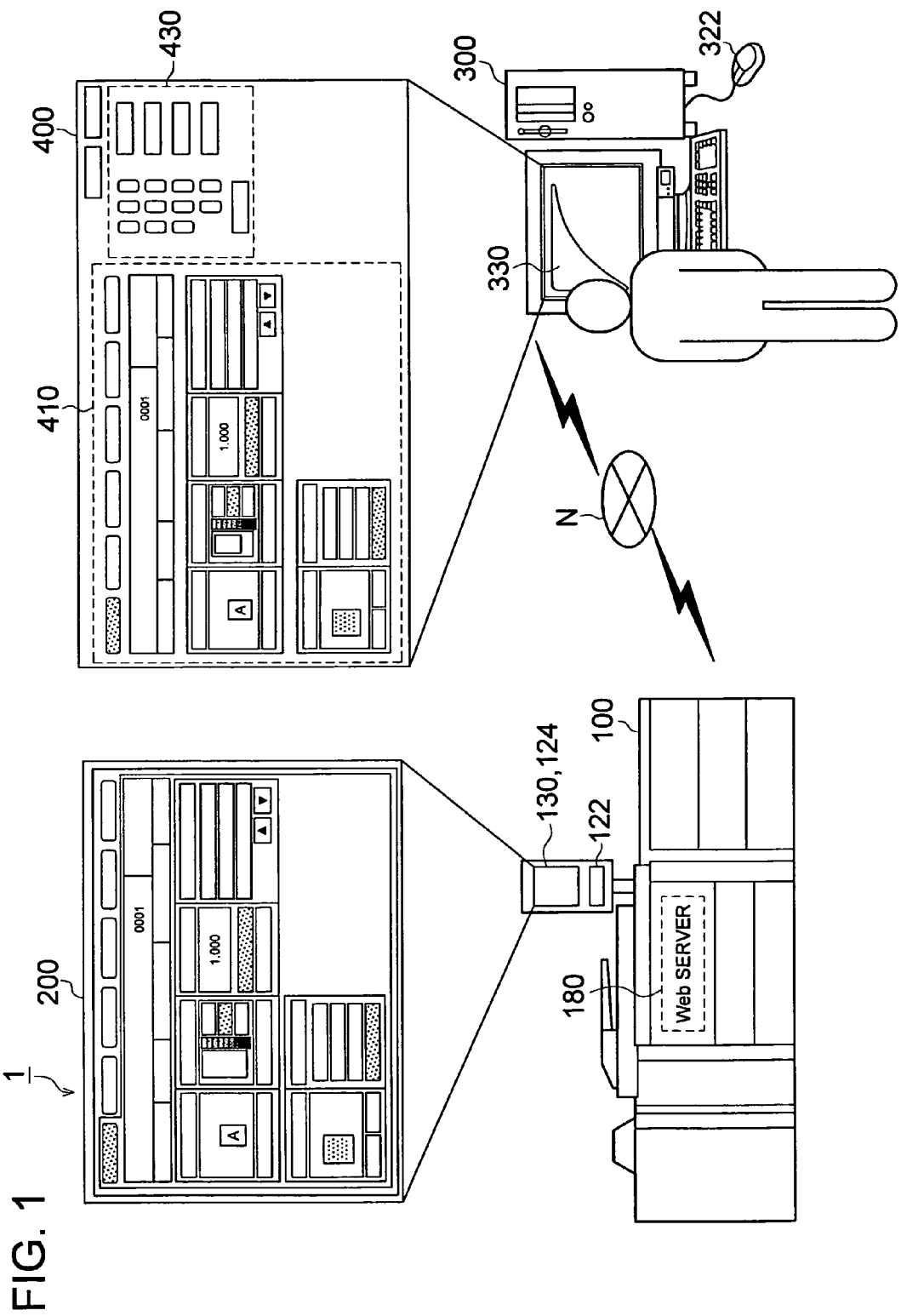
FIG. 1 is an outline configuration diagram of an image forming system 1 according to a first preferred embodiment of the present invention.

FIG. 1 is an outline configuration diagram of an image forming system 1. As is shown in FIG. 1, the image forming system 1 is configured by connecting a copying machine 100 as an apparatus that is the target of remote operation to a remote operation terminal 300 so that they can communicate with each other via communication lines N. Here, in the present preferred embodiment, although the discussions have been applied to a copying machine which is an example of an image forming apparatus which is the operation target apparatus, it is possible to apply suitably as long as it is an apparatus that carries out image formation on a recording medium as an image forming apparatus, and can, for example, be a printer or a facsimile apparatus, etc.

As is showing in FIG. 1, the copying machine 100 is provided with hard keys 122 and a display section 130 on which a touch panel 124 is superimposed. The user carries out modifications of various types of settings of the copying machine 100 or gives the copy start instruction, etc., by pressing the hard keys 122 or by touching the touch panel 124. The display section 130 displays the main operation screen 200 that shows the setting items or the operating states etc. of the copying machine 100.

Further, the copying machine 100 also possesses the function as a web server 180, and when connected to communication lines N using a communication protocol such as TCP/IP, it is possible to make external accesses to this web server 180. The web server 180, transmits the remote operation screen data 172 (see FIG. 3) in response to the requests from the accessing remote operation terminal 300.

The remote operation terminal 300 is a client terminal apparatus for remotely operating the operation of the copying machine 100, and is configured using, for example, a personal computer or a PDA (Personal Digital Assistant), etc. As is shown in FIG. 1, the remote operation terminal 300 is provided with a key board or mouse 322, a display section 330, etc.

Figure 2:
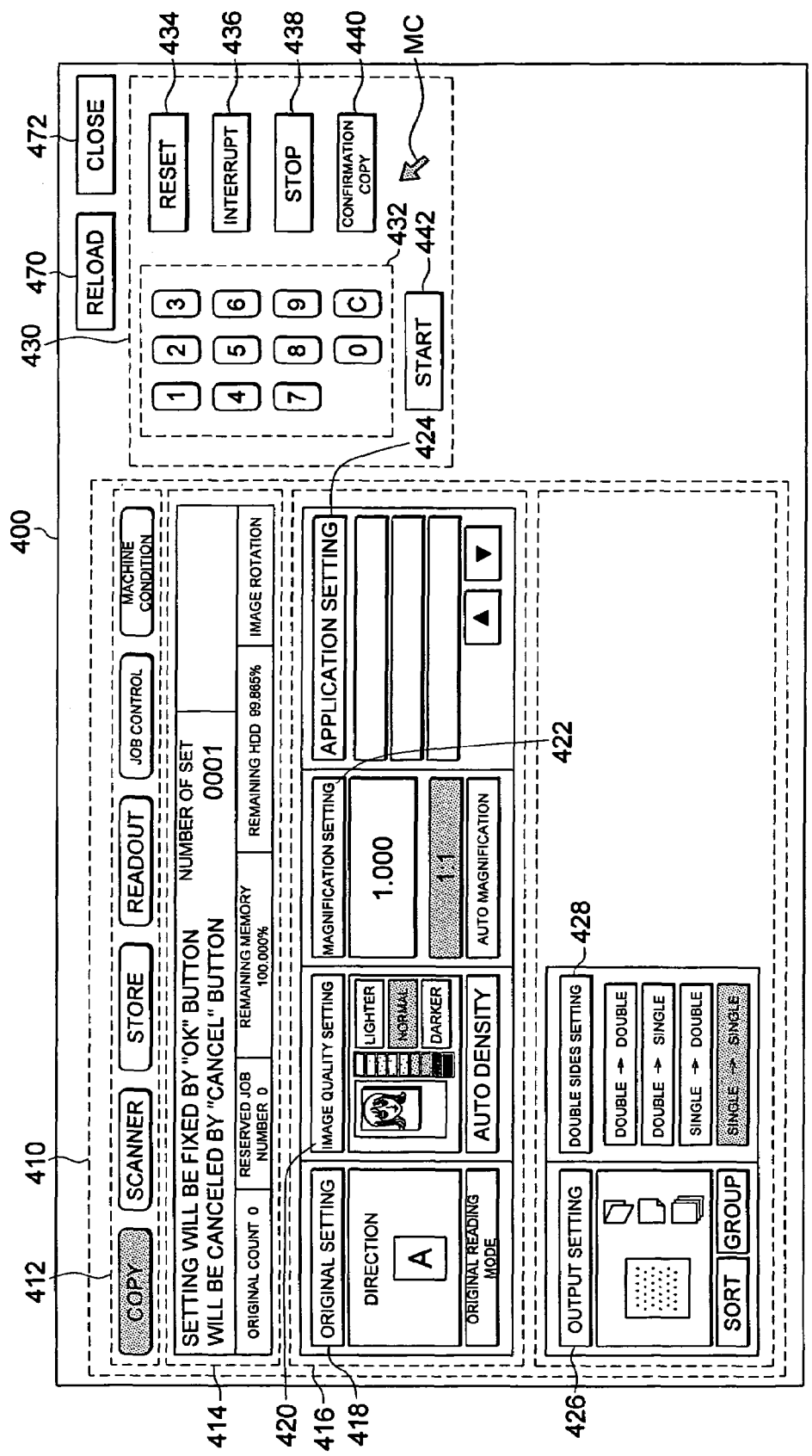
FIG. 2 is a diagram showing a remote operation screen 400 according to a first preferred embodiment of the present invention.

Further, the remote operation terminal 300 is provided with the functions of a web server, and when connected to communication lines N using a communication protocol such as TCP/IP, it can access the copying machine 100, and based on the remote operation screen data 172 (see FIG. 3) that has been transmitted, it can display the remote operation screen 400 such as the one shown in FIG. 2 in the display section 330.

As is shown in FIG. 2, the remote operation screen 400 displayed in the remote operation terminal 300 includes a remote setting panel screen 410 and a hard key panel screen 430. The remote setting panel screen 410 of the remote operation screen 400 includes the same contents of display as that in the main operation screen 200 that is being displayed in the copying machine 100, and the display is updated by the remote operation terminal 300 making a transmission request of the remote operation screen data 172 to the web server 180.

The remote setting panel screen 410 is configured to have the tab buttons 412, the operating status display area 414, and the item-wise settings area 416. The tab buttons 412 are the buttons for selecting the display of setting items that have been classified according to each of the functions of the copying machine. The operation status display area 414 is the area for displaying the details of the operation currently being executed by the copying machine, the status of its usage, etc. The item-wise settings area 416 is the area in which settings are made for the setting items for the function that has been selected by the tab buttons 412.

In FIG. 2, the copying function has been selected by the corresponding tab button 412, and hence, the original settings button 418 for setting the orientation of the images in the original document, etc., the image quality setting button 420 for setting the image density, the magnification setting button 422 for setting the magnification to be used during copying, the application setting button 424 for selecting the application, the output settings button 426 for setting the method of sheet finishing at the time of outputting the recording sheet, and the double-side setting button 428 for setting double-sided (duplex) printing function are displayed in the item-wise settings area 416. When the user moves the mouse cursor MC to any one of these setting buttons and then clicks the mouse 322, a settings screen corresponding to the selected item is displayed in a window format, and detailed settings can then be made by the user in those setting screens.

The hard key panel screen 430 is a set of display buttons that replicate the operation keys in the hard keys 122 of the copying machine 100, and is configured to include the numerical buttons 432, the reset button 434 for resetting the contents of settings, the interrupt button 436 for carrying out interrupt processing during copying, the stop button 438 for stopping the copying operation, the confirmation copy button 440 for giving a confirmation copy of the contents of the settings, and the start button 442 for starting the copying.

By touching the different buttons on the main operation screen 200 on the copying machine 100, the user makes the settings to be used during copying, and starts the copying or resets the settings by pressing the hard keys 122. Further, on the other hand, the user at the remote operation terminal 300 can carry out remote operation of the copying machine 100 from the remote operation terminal 300 by clicking remote settings panel screen 410 or the hard key panel screen 430 in the remote operation screen 400. In specific terms, when the different buttons in the remote operation screen 400 are clicked, at the copy machine side, the same operations will be made as when the corresponding touching operation on the main operation screen 200 or the pressing operation of the hard keys 122 in the copying machine itself.

Further, a reload button 470 and a close button 472 are displayed in the remote operation screen 400. When the reload button 470 is clicked by the user, the remote operation terminal 300 issues to the copying machine 100 a transmission request for the latest remote operation screen data 172, and then carries out updating of the display of the remote operation screen 400. The close button 472 is a button for closing the remote operation screen 400.

When the user clicks the mouse 322 on the remote operation screen 400, the operation information indicating the contents of that operation is transmitted from the remote operation terminal 300 to the copying machine 100.

(Configuration of Remote Operation Terminal 300)

Figure 3:
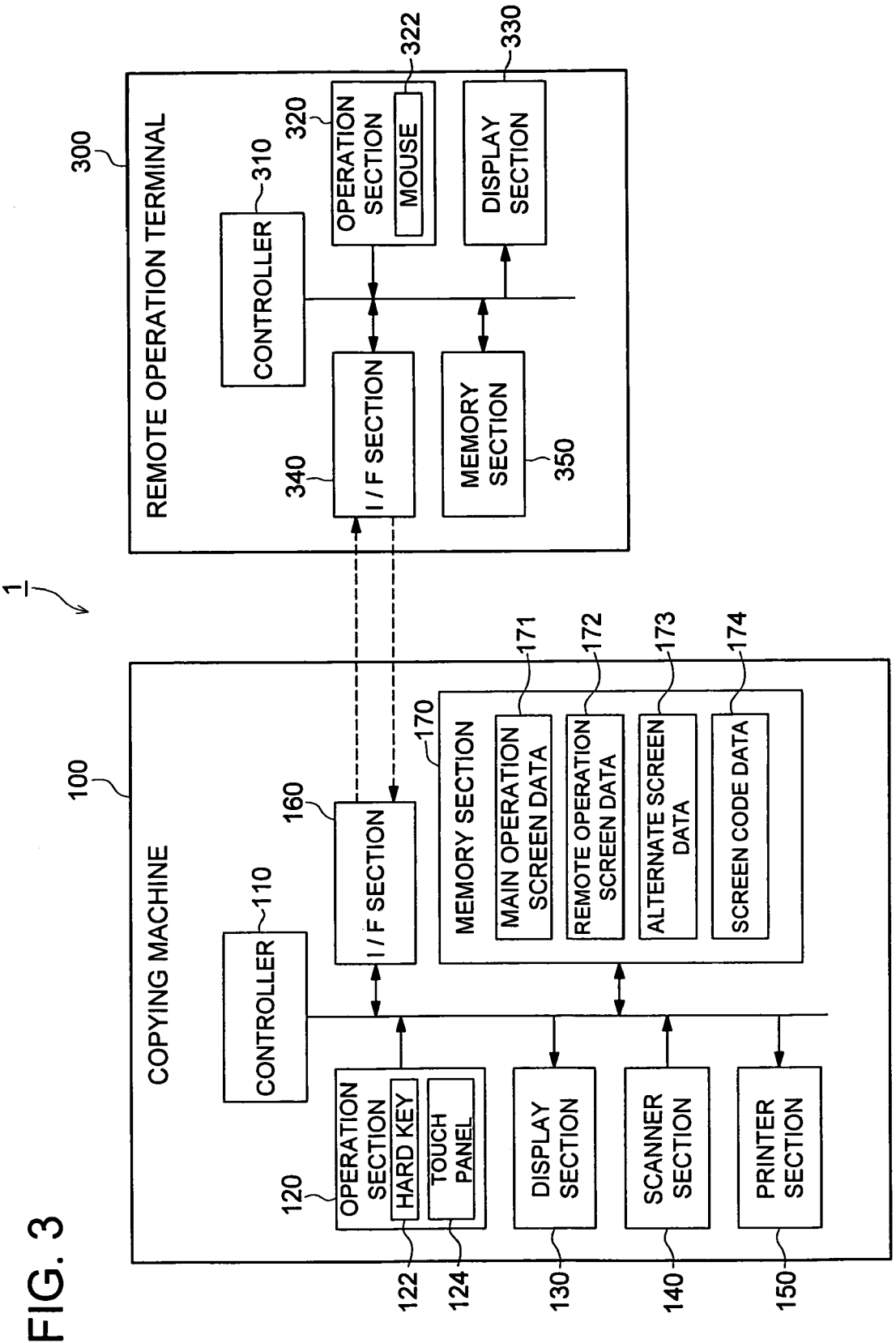
FIG. 3 is a block diagram showing the functional configuration of the image forming system 1.

FIG. 3 is a block diagram showing the functional configuration of the image forming system 1.

To begin with, the functional configuration of the remote operation terminal 300 is explained here. The remote operation terminal 300, as is shown in FIG. 3, is configured using an ordinary personal computer to include a controller 310, an operation section 320, a display section 330, an interface section 340, and a memory section 350.

The controller 310 is a functional section that carries out processing based on a prescribed program according to the instruction that is input, comprehensively manages and controls the remote operation terminal 300 by carrying out input and output of instructions or data to the different functional sections, and is configured to have a CPU (Central Processing Unit), a ROM (Read Only Memory), a RAM (Random Access Memory), etc.

In specific terms, the CPU reads out the program stored in the ROM or the memory section 350 according to the operation signal that has been input from the operation section 320, and carries out the processing according to that program. Further, it displays the result of processing in the display section 330.

The operation section 320 is provided with a key board having cursor keys, ten keys, and various types of function keys, and a pointing device such as a mouse 322 etc., and outputs to the controller 310 the key depression signals of the operated keys and the position signals of the mouse 322.

The display section 330 is configured from a CRT (Cathode Ray Tube), or an LCD (Liquid Crystal Display), etc., and carries out display output of various types of screens based on the display data input from the controller 310.

The interface section 340 is a functional section for carrying out data communication by connecting to communication lines N, and is configured to have a modem or a LAN interface, a USB interface, etc.

The memory section 350 is a functional section that carries out data read and write to storage media such as, for example, a CD-ROM, a memory card, or a hard disk, etc. The storage medium is configured from a magnetic recording medium, an optical recording medium, or semiconductor memories, etc., and stores the application programs and the data processed by different programs.

The controller 310 functions as a web browser and displays the remote operation screen in the display section 330. Further, the when the position signals of the mouse are output from the operation section 320, the x-coordinate and the y-coordinate are obtained of the mouse cursor MC in the remote operation screen 400 that is displayed in the display section 330. The obtained data of the coordinates is transmitted to the copying machine 100 via the interface section 340, thereby making a request for transmission of the remote operation screen data 172. Upon obtaining the remote operation screen data 172 transmitted from the web server 180 of the copying machine 100, the controller 310 updates the display of the remote operation screen 400 based on that remote operation screen data 172. Because of this, the remote operation terminal 300 displays the remote operation screen 400 based on the remote operation screen data 172 transmitted by the web server 180.

(Configuration of the Copying Machine 100)

Next, the functional configuration of the copying machine 100 is described here. As is shown in FIG. 3, the copying machine 100 is provided with a controller 110, an operation section 120, a display section 130, a scanner section 140, a printer section 150, an interface section 160, and a memory section 170.

The controller 110 is a functional section that carries out processing based on a prescribed program according to the instruction that is input, comprehensively manages and controls the copying machine 100 by carrying out input and output of instructions or data to the different functional sections, and is configured to have a CPU (Central Processing Unit), a ROM (Read Only Memory), a RAM (Random Access Memory), etc.

The operation section 120 is provided with hard keys 122 having various types of keys such as numeric keys, a start key, a reset key, etc., and outputs to the controller 110 the key depression signals of the operated hard keys 122. Further, the operation section 120 is provided with a touch panel 124 that is formed integrally with the display section 130, detects the position in the touch panel 124 that was touched by the user with a finger or a touch pen, and outputs the position signals to the controller 110.

The display section 130 is configured from a CRT, or an LCD (Liquid Crystal Display), etc., on which a touch panel has been superimposed. The display section 130 carries out display output of various types of screens based on the display data input from the controller 110. In particular, in this preferred embodiment, the display section 130 displays the main operation screen 200 based on the main operation screen data 172 stored in the memory section 170, and also displays the alternate screen based on the alternate screen data 173 stored in the memory section 170.

The scanner section 140 is a functional section that reads out as image data the original document placed on the document loading table. In concrete terms, after conveying the document placed on the document loading table is conveyed to the contact glass, the light reflected from the document which is illuminated by light from a light source is made to impinge on a CCD (Charge Coupled Device) image sensor via a mirror unit and a focusing lens and is read out as image data.

The printer section 150 is a functional section that forms images on the transfer sheet, exposes and scans the photoreceptor drum using a laser beam emitted from an exposure section, and forms an electrostatic latent image based on the image data read out from the scanner section 140. Next, the developing material is made to get adhered to the photoreceptor drum by the developing section and transfers it on to the transfer sheet. Finally, the toner on the transfer sheet is fixed thermally in the fixing section thereby forming the image.

The interface section 160 is a functional section for carrying out data communication by connecting to communication lines N, and is configured to have a modem or a LAN interface, a USB interface, etc.

The memory section 170 is a functional section that carries out data read and write to storage media such as, for example, a VRAM (Video RAM), a CD-ROM, a memory card, or a hard disk, etc. The storage medium is configured from a magnetic recording medium, an optical recording medium, or semiconductor memories, etc., and stores the application programs and the data processed by different programs.

Further, the memory section 170, as is shown in FIG. 3, stores the main operation screen data 171, the remote operation screen data 172, the alternate screen data 173, and the screen code data 174.

The main operation screen data 171 is an image data in the HTML format for displaying the main operation screen 200. When the different types of buttons in the main operation screen 200 are touched or when some click operations are made in the remote operation screen 400 of the remote operation terminal 300 by the user, the settings screens for carrying out detailed settings corresponding to those operations are displayed in a window format in an overlapping manner. Further, in the main operation screen data 171, screen codes are allocated according to the screen to be displayed based on that data. This screen code is determined by the screen being displayed in the top-most layer in the main operation screen 200.

The remote operation screen data 172 is an image data for displaying the remote operation screen 400 in the remote operation terminal 300. The controller 110 generates the image data for displaying the hard key panel screen 430, and by synthesizing this image data and the main operation screen data 171, it generates the remote operation screen data 172 for displaying the remote operation screen 400 as is shown in FIG. 2.

The controller 110 realizes the web server 180 shown in FIG. 1 due to the cooperation between the CPU and the program stored in the ROM. Upon receiving the coordinates data transmitted from the remote operation terminal 300 functioning as a web browser, that data is compared with the x-coordinate and y-coordinate values of the coordinates data of the remote operation screen data 172, and a judgment is made as to at which position in the remote operation screen 400 was the click operation made. Next, if a button in the remote settings panel screen 410 is judged to have been clicked, the controller 110 not only generates and updates the main operation screen data 171 for displaying the settings screen corresponding to that button, but also updates the remote operation screen data 172 based on that main operation screen data 171.

As a result, while on the one hand, the copying machine 100 displays the main operation screen 200 based on the main operation screen data 171, on the other hand, the remote operation terminal 300 can display the remote operation screen 400 that includes the remote settings panel screen 410 identical to the main operation screen 200 based on the remote operation screen data 172.

Further, when it is judged that a button displayed in the hard keys panel screen 430 has been clicked, the controller 110 judges that it is equivalent to a depression of the hard key 122 corresponding to that button, and carries out the processing (for example, start of copying) corresponding to that hard key 122.

The alternate screen data 173, in the display section 130 of the copying machine 100, is the data for displaying a screen other than the main operation screen 200, and can be stored beforehand in the memory section 170, or the data can be transmitted from the remote operation terminal 300.

Figure 4:
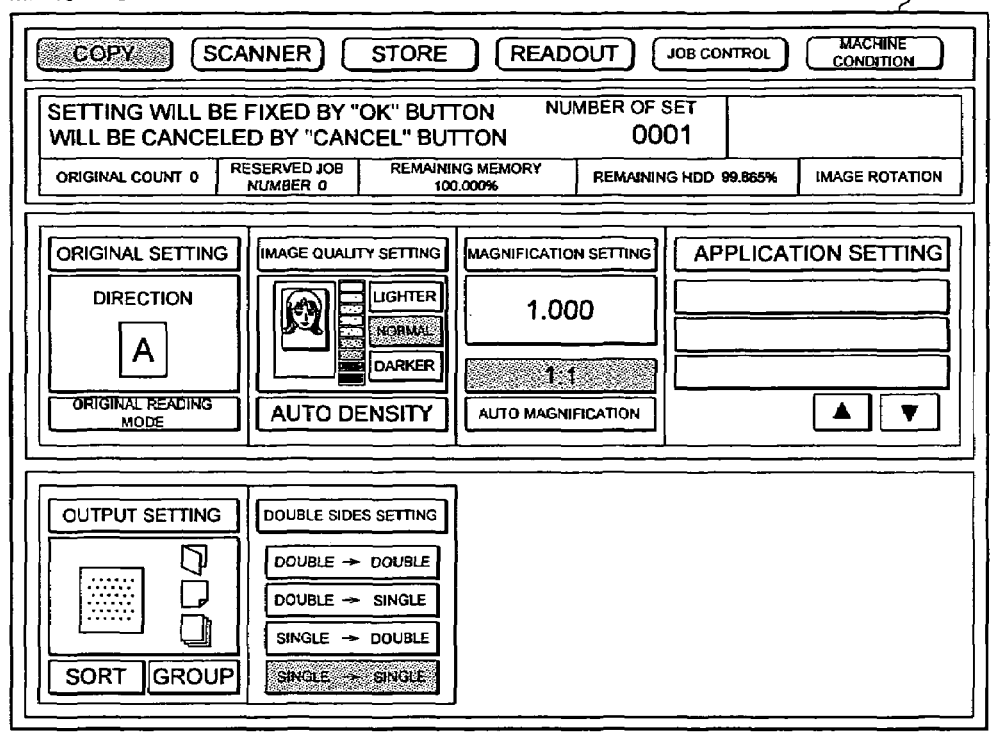
FIG. 4 is a schematic diagram of the memory bank.

The memory of the memory section 170 has been divided into a plurality of memory banks, and, as is shown in FIG. 4, in the initial setting, the main operation screen data 171 is allocated to the memory bank MB0, and the alternate screen data 173 is allocated to the memory bank MB1.

Figure 5:
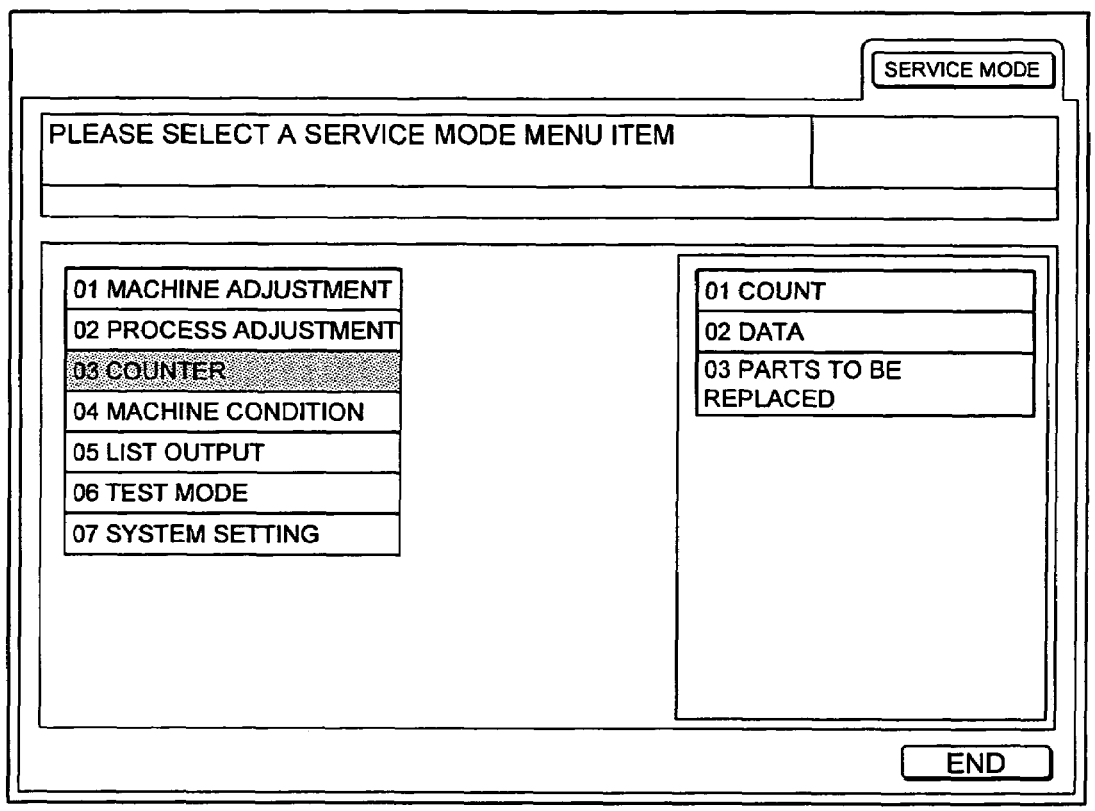
FIG. 5 is a diagram showing an example of the service mode screen.

The screen code data 174, which is the judgment standard information in the present preferred embodiment, is the data establishing correspondence between the screen codes corresponding to each operation screen and the information indicating whether or not that operation screen is a service mode screen. A service mode screen is, as is shown in FIG. 5, a screen displayed at the time a service personnel carries out special settings such as altering the adjustment values or counter values, etc., and is an example of special screens that should not be displayed to the common user and in which operations by the common user are to be prohibited.

The controller 110, referring to the screen code data 174, judges whether or not the screen indicated by the main operation screen data 171 is a service mode screen, and, if that screen is a service mode screen, the controller 110 displays the alternate screen in the display section 130.

(Operation of the Image Forming System 1)

Next, the operation of the image forming system 1 is described below.

Figure 6:
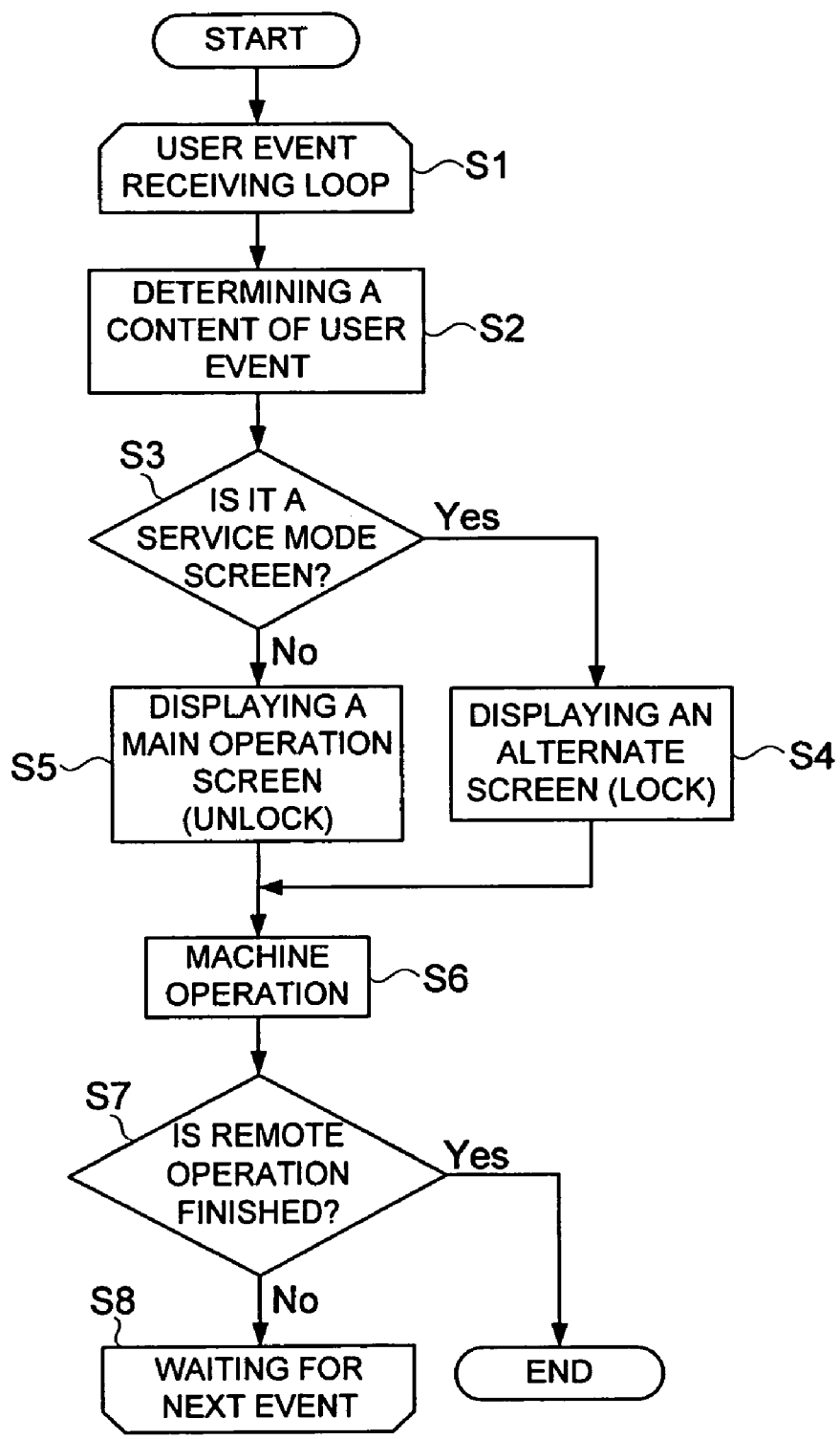
FIG. 6 is a flow chart showing the remote controlling process.

FIG. 6 is a flow chart showing the remote controlling process executed in the copying machine 100. However, the remote control process of FIG. 6 is a process executed based on remote control programs, and although these programs would have been stored in the ROM or the memory section 170 of the controller 110, they have not been shown in the figure here.

In the display section 130 of the copying machine 100, the main operation screen 200 is displayed based on the main operation screen data 171 stored in the memory bank MB0.

To begin with, when the user clicks any button in the remote operation terminal 300, the user event is received by the copying machine 100 via the interface section 160, and the processing enters the user event receiving loop (Step S1). Here, a user event is an event (phenomenon) generated by the user, and is, in concrete terms, the reception of the coordinate data transmitted by the remote operation terminal 300 due to a clicking operation of the mouse 322.

Next, based on that received coordinates data, the content is judged (Step S2) of the operation made by the user in the remote operation terminal 300. In specific terms, a judgment is made as to which button was clicked in the remote operation screen 400, and also, the screen code of the next screen to be displayed in the main operation screen 200 due to this clicking operation.

Next, the screen code data 174 of the memory section 170 is referred to, and a judgment is made as to whether the next screen is a service mode screen or not (Step S3).

If the next screen is a service mode screen (YES in Step S3), the controller 110 switches the data to be displayed in the display section 130 to the memory bank MB1, and displays the alternate screen based on the alternate screen data 173 (Step S4). Thereafter, until the service mode screen ends, the main operation screen data 171 and the remote operation screen data 172 are updated based only on the operation information transmitted from the remote operation terminal 300, and the operations from the operation section 120 will not be accepted (locked).

If the next screen is not a service mode screen (NO in Step S3), the controller 110 displays in the display section 130 the main operation screen 200 as usual based on the main operation screen data 171 (Step S5). Here, when the display is switched from a service mode screen to a screen that is not a service mode screen, the data displayed in the display section 130 is switched from the memory bank MB1 to the memory bank MB0, and also, the main operation screen data 171 and the remote operation screen data 172 are updated based also on the operations from the operation section 120 (unlocked).

Next, updating of the main operation screen data 171 and issuing of operation instructions to the different functional sections are made according to the user generated event (Step S6). If the displayed screen is a service mode screen, since the alternate screen is displayed in the display section 130, although it is not possible to see the main operation screen 200 in the copying machine 100, in the remote operation terminal 300, it is possible to continue to carry out the operations because even the remote operation screen data 172 will be updated along with the updating of the main operation screen data 171.

Next, a judgment is made as to whether or not to the remote operation is ended, and if it is judged that the remote operation is to be ended (YES in Step S7), the remote control process is ended.

On the other hand, if it is judged that the remote operation is not to be ended (NO in Step S7), after waiting for the generation of the next user event (Step S8), the processing of the user event reception loop Steps S1 to S8 is repeated.

As has been explained above, according to the image forming system 1 of the first preferred embodiment, at the time of remotely operating the copying machine 100 from the remote operation terminal 300, it is possible to avoid the display of the service mode screen in the copying machine 100. In addition, while the alternate screen is being displayed in the display section 130, since the operation information from the operation section 120 is not accepted, it is possible to prevent contention of operation information.

Further, in the first preferred embodiment, although the explanations were given above for the example of a service mode screen that is a special screen whose display is to be inhibited, it is not necessary to limit to this case and it is also possible to set (register) beforehand the screens whose display is to be inhibited. In that case, the registration can be made either in the remote operation terminal 300 or in the copying machine 100. In addition, it is also possible to control the display enable/disable in the copying machine 100 based on the user rights of the user of the remote operation terminal 300. For example, the screens that are displayed at the time a system manager makes settings may not be displayed but an alternate screen can be displayed.

Second Preferred Embodiment

Next, referring to FIGS. 7 to 10Q a second preferred embodiment applying the present invention is described below.

In the image forming system 2 shown in the second preferred embodiment, identical numerical symbols are assigned to the same constituent parts as those shown in the first preferred embodiment and explanations of those configuration parts will be omitted. In the following, the configuration parts and processing special to the second preferred embodiment are described below.

In the image forming system 2, the operation information of the sequence of remote operations that were made in the remote operation terminal 300 are recorded and reproduced. When the user makes a click operation of the mouse 322 in the remote operation screen 400, the operation information indicating the content of that operation is transmitted from the remote operation terminal 300 to the copying machine 100, and that operation information is recorded in the copying machine 100 in a temporal sequence. This operation information that is accumulated and stored is called a script in the present preferred embodiment. Based on this stored script, it is possible to reproduce different types of settings by reproducing the sequence of operations carried out once by the user previously.

Figure 7:
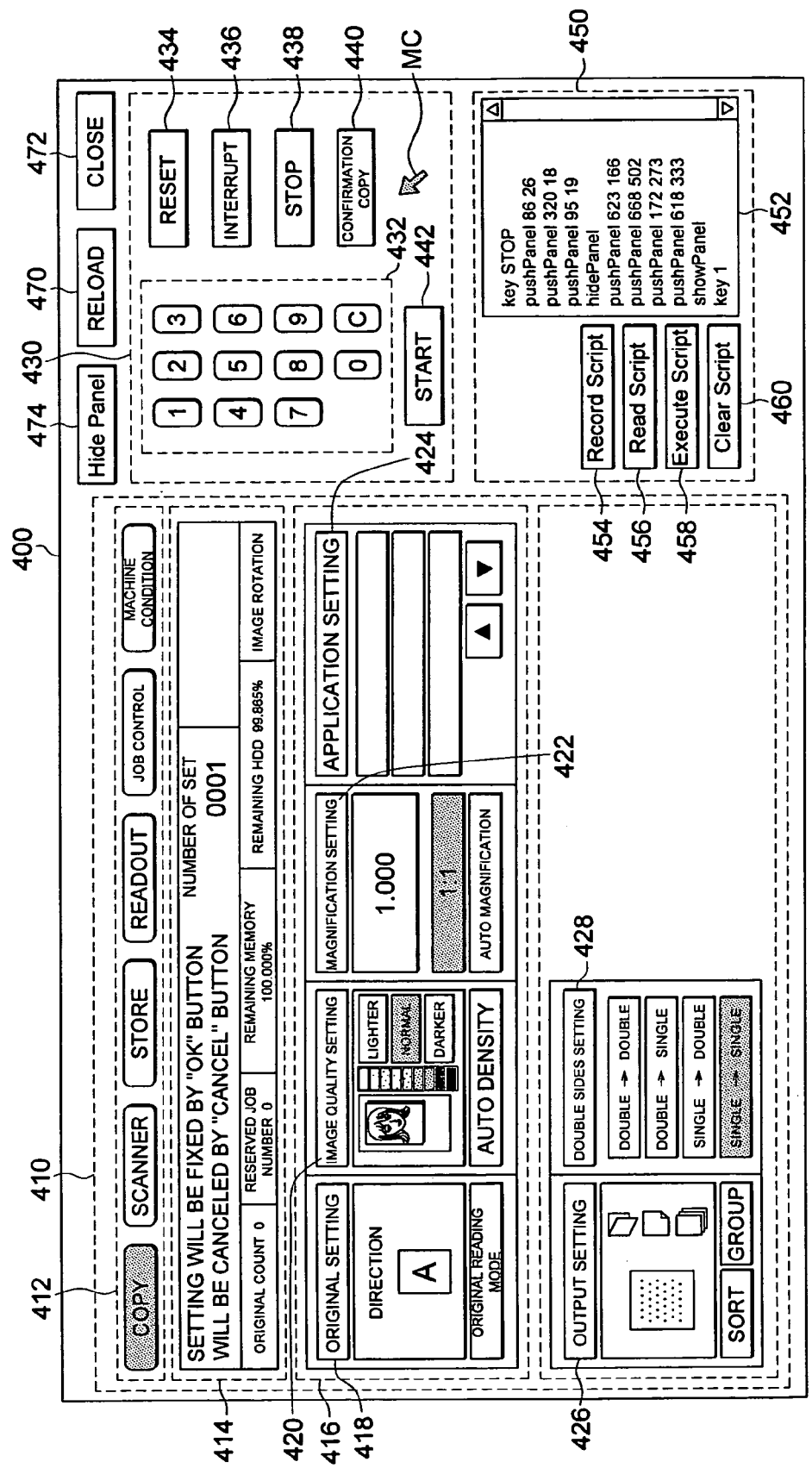
FIG. 7 is a diagram showing a remote operation screen 400 according to a second preferred embodiment of the present invention.

FIG. 7 is a diagram showing a remote operation screen 400 of the remote operation terminal 300. The remote operation screen 400 shown in FIG. 7 has a configuration similar to that of the remote operation screen 400 shown in FIG. 2 except that the script panel screen 450 and a lock button 474 have been added to its configuration.

The script panel screen 450 is an operation panel for managing scripts, and has a script display area 452 for displaying the content of the script, a record button 454, a read out button 456, and an execute button 458, and a clear button 460.

The user, after clicking the record button 454, carries out various settings by clicking the remote settings panel screen 410 and the hard key panel screen 430. Every time this clicking is done, the operation information is successively recorded and is displayed in the script display area 452. Next, when the user clicks the start button, the recording of the script is ended, and the completed script is stored in the memory section 170 of the copying machine 100. Next, when the user clicks the read out button 456 and selects the desired script, the desired script stored in the memory section 170 is read out by the controller 110, and thereafter, when the user clicks the execute button 458, a sequence of operations are reproduced by the controller 110 based on the operation information in the script. The clear button 460 is a button for erasing a script already stored in the copying machine 100 or a script being recorded.

The lock button 474 is a button for giving an instruction not to display the main operation screen 200 in the display section 130 of the copying machine 100 but to display only the alternate screen. The lock button differs from other buttons in that it is a command button provided on the web browser screen, and when this button is clicked, the controller 310 of the remote operation terminal 300 generates a lock command and sends that command to the copying machine 100. Upon receiving this lock command, the controller 110 of the copying machine 100 carries out control so as to display the alternate screen in the display section 130. As another form, it is also possible to handle the lock button in a manner similar to the other buttons. In other words, when the lock button is clicked, the controller 310 can transmit the coordinates of the position of the click operation to the copying machine 100 via the interface section 340. In this case, the controller 110 of the copying machine 100 can detect that the lock button was clicked based on the coordinates data transmitted from the remote operation terminal 300, and can carry out control so as to display the alternate screen in the display section 130. In other words, at the time of carrying out remote operation of the copying machine 100 from the remote operation terminal 300, the coordinate data indicating the position of the lock button 474 becomes the specification information.

After the lock button 474 has been clicked, the unlock button will be displayed in the position of the lock button 474. In other words, the lock button 474, in appearance, constitutes a lock/unlock toggle button. If the unlock button is clicked in this state, the controller 310 of the remote operation terminal 300 transmits the lock release instruction as a command to the copying machine 100 via the interface section 340. Upon receiving this lock release instruction, the controller 110 of the copying machine 100 carries out control so as to display the main operation screen 200 in the display section 130. Further, after the lock button 474 has been clicked until the unlock button has been clicked, the locked condition will be maintained and operations from the operation section 120 of the copying machine 100 will not be accepted. However, although explanation was given here taking the example of a toggle switch form for the lock button 474, it is not necessary to restrict to this form, but it is possible, for example, to provide a lock button and an unlock button side by side.

Figure 8:
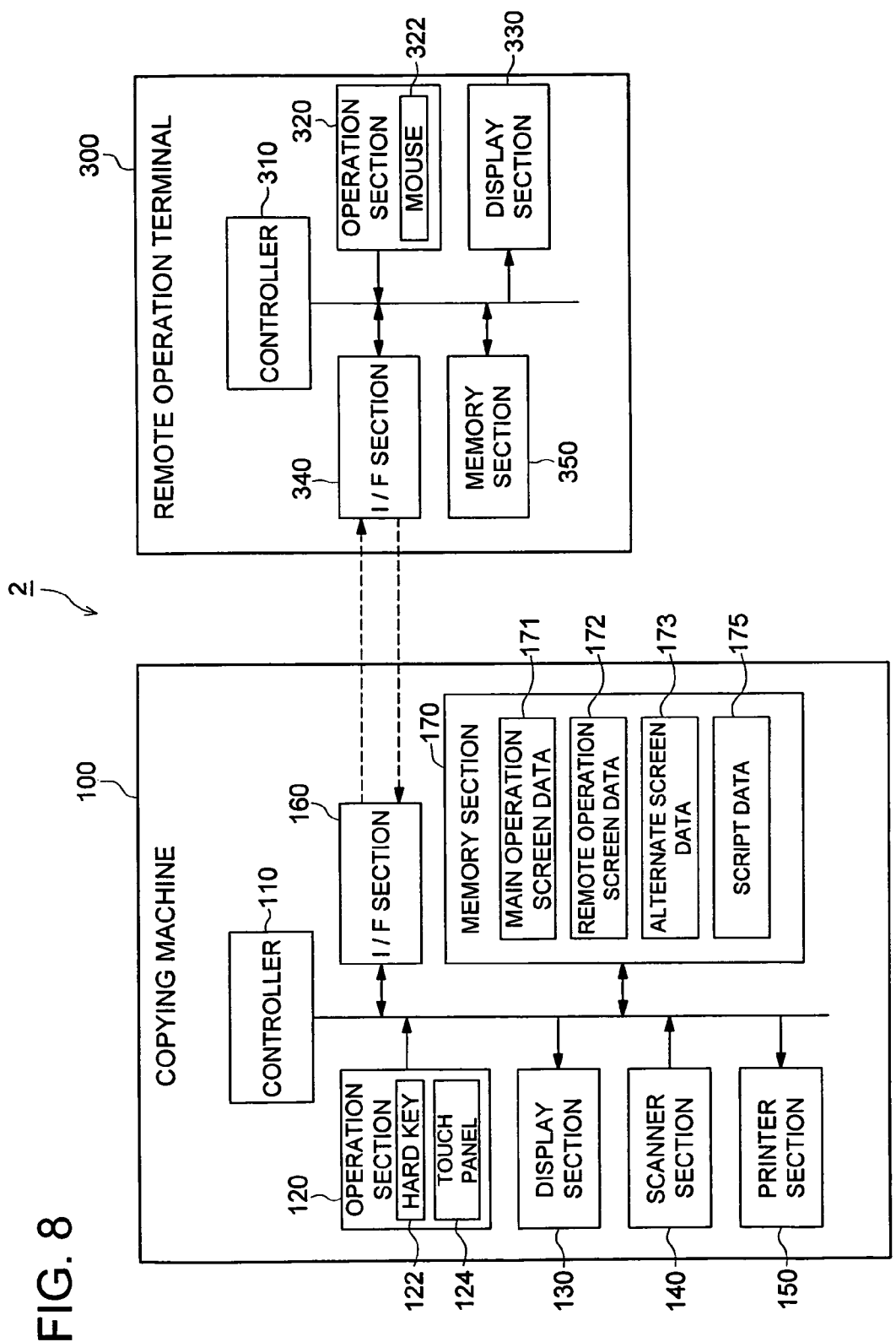
FIG. 8 is a block diagram showing the functional configuration of the image forming system 2 according to a second preferred embodiment of the present invention.

FIG. 8 is a block diagram showing the functional configuration of the image forming system 2.

The controller 110 generates the image data for displaying respectively the hard key panel screen 430 and the script panel screen 450, and the remote operation screen data 172 for displaying the remote operation screen 400 is generated by synthesizing this image data and the main operation screen data 171.

The memory section 170 stores the main operation screen data 171, the remote operation screen data 172, the alternate screen data 173, and the script data 175.

The script data 175, which is information of the operational procedure, is a data table for storing in time-series the information of the series of operations made by the user in the remote operation terminal 300. The controller 110, based on the position coordinates data received from the remote operation terminal 300, judges at which position in the remote operation screen 400 was the clicking operation made, and stores the result of that judgment accumulating sequentially as operation information in the form of "command arguments".

Figure 9:
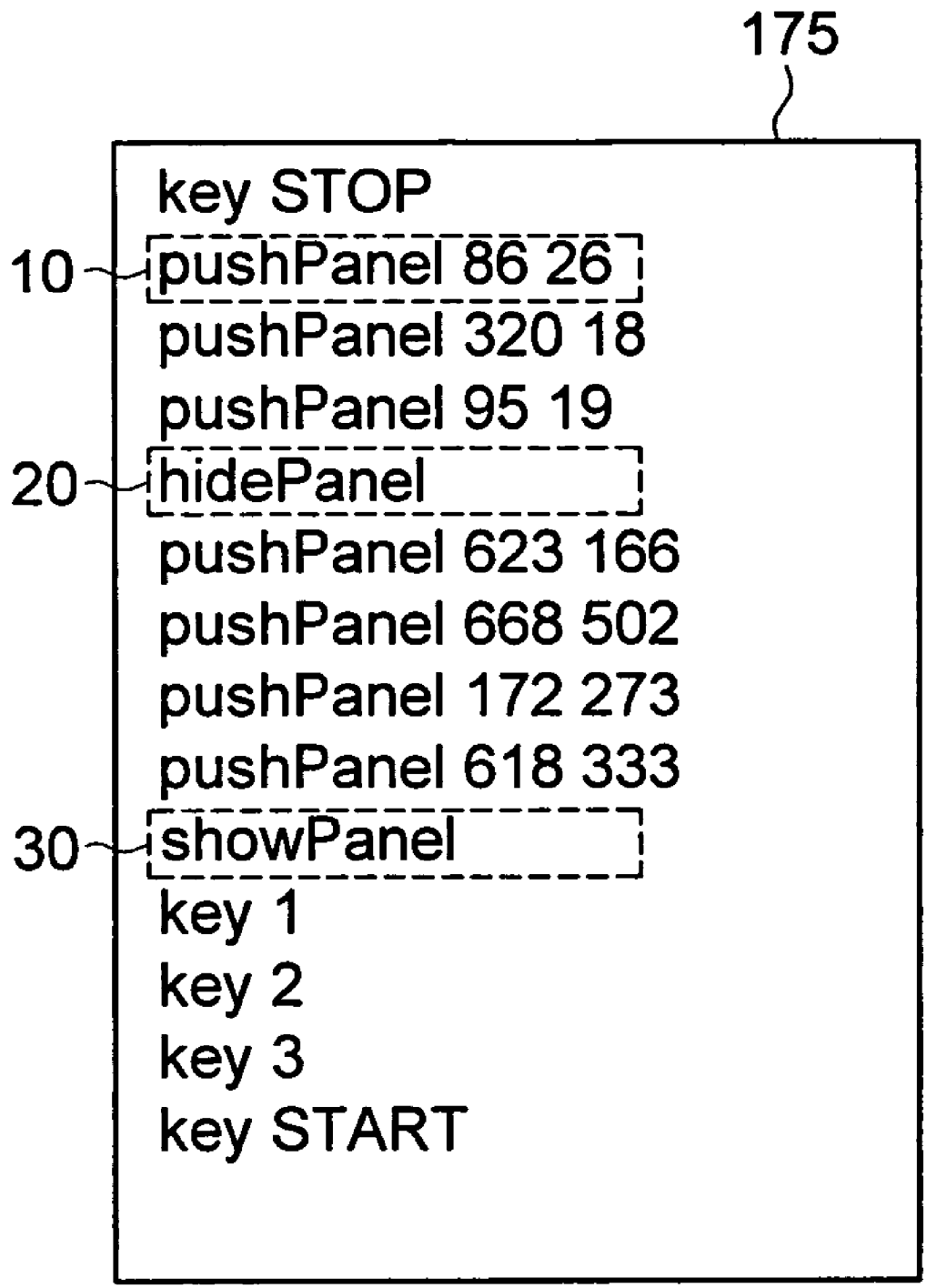
FIG. 9 is a diagram showing an example of the data configuration of a script data 175.

FIG. 9 is a diagram showing an example of the data configuration of a script data 175. For example, the operation information 10 indicates that the mouse 322 was clicked at the position with an x-coordinate of "86" and a y-coordinate of "26" in the remote settings panel screen 410. Further, the operation information 20 indicates that the lock button 474 was clicked, and the operation information 30 indicates that the unlock button was clicked.

By reading out successively the operation information within in the script data 175 stored in this manner and by carrying out the processing according to the operation expressed by that operation information, it is possible to reproduce the series of operations by the user stored in that script data 175, and because of this, it is possible to reproduce the operations that have been carried out previously by the user.

Figure 10:
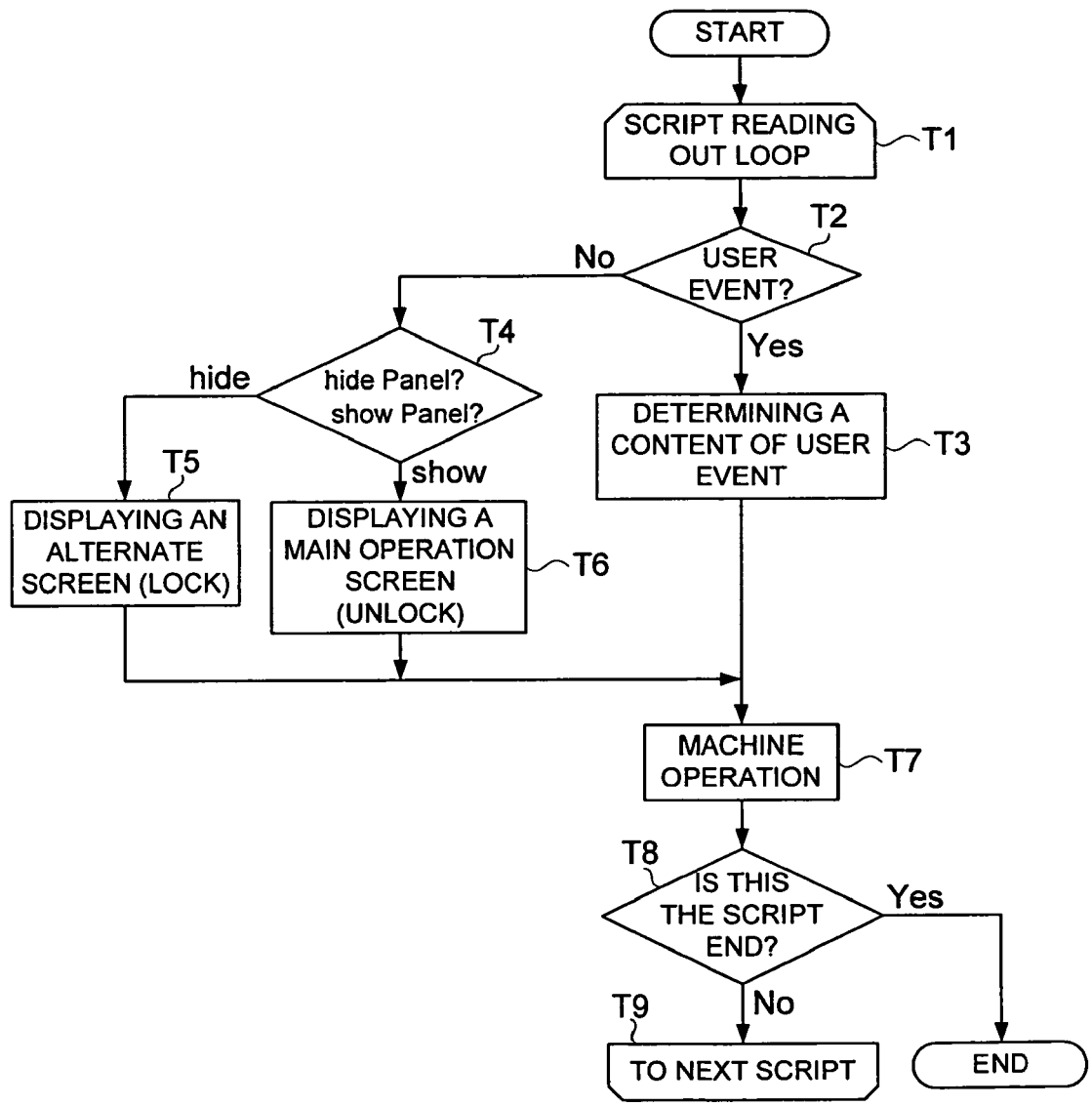
FIG. 10 is a flow chart showing the script reproduction processing.

Next, referring to FIG. 10, the script reproduction processing is explained below. When the controller 11 of the copying machine 100 judges from the coordinates data transmitted from the remote operation terminal 300 that, for example, the read out button 456 was clicked in the script panel screen 450 and that a script data 175 was selected from among a plurality of script data 175 and the execute button 458 was pressed, it reads out the script reproduction program, and starts the script reproduction processing based on that program.

To begin with, the reading out loop of the script data 175 is entered, and the operation information is read out one by one from the beginning of the script data 175 (Step T1), and a judgment is made as to whether or not that operation information is a user event or not (Step T2).

When the command in the operation information is either "key" or "pushpanel", the operation information is judged to be a user event (YES in Step T2), and the content of the operation made by the user at the remote operation terminal 300 is judged (Step T3). In more concrete terms, a judgment is made as to which button in the remote operation screen 400 was clicked.

On the other hand, when the operation information is judged not to be a user event (NO in Step T2), a judgment is made as to whether the command in the operation information is "hidepanel" or "showpanel" (Step T4).

When the command in the operation information is "hidePanel" (HIDE in Step T4), the data displayed in the display section 130 is switched from the memory bank MB0 to the memory bank MB1, and the alternate screen is displayed based on the alternate screen data 173 (Step T5). Thereafter, until a "showpanel" command is read out, the alternate screen will be displayed in the display section 130. In addition, the main operation screen data 171 and the remote operation screen data 172 are updated based only on the operation information transmitted from the remote operation terminal 300, and also, the operations from the operation section 120 will not be accepted (locked state).

When the command in the operation information is "showpanel" (SHOW in Step T4), the data displayed in the display section 130 is switched from the memory bank MB1 to the memory bank MB0, and the main operation screen is displayed based on the main operation screen data 171 (Step T6). In addition, the main operation screen data 171 and the remote operation screen data 172 are updated based also on the operations from the operation section 120 (unlocked state). In other words, in the present preferred embodiment, at the time of reproducing the script data 175, the commands "hidepanel" and "showpanel" become the specification information.

After carrying out the processings of Step T3, Step T5, and Step T6, the updating of the main operation screen data 171 and the giving of the operation instructions to the different functional sections are made according to the command that has been received (Step T7). In concrete terms, if the command was "key", the same processing operations are reproduced as those made when the hard key 122 indicated by the argument of the command has been pressed, and if the command was "pushPanel", the same processing operations are reproduced as those made when the button in the main operation screen 200 indicated by the argument of the command has been touched.

Next, a judgment is made as to whether or not the read out operation information is the end of the script data 175 (Step T8), and if it is not the end (NO in Step T8), the next operation information is read out (Step T9), and the processing of Step T1 to Step T9 is repeated. Further, if it was the end of the script data 175 (YES in Step T8), the script reproduction processing is ended.

As has been explained so far, according to the image forming system 2 of the second preferred embodiment, it is possible to avoid displaying the main operation screen 200 in the copying machine 100 when a lock instruction has been output as a command after the lock button 474 has been clicked in the remote operation terminal 300 and this lock command has been received by the copying machine 100, or, when the command "hidepanel" was read out from the script data 175.

Third Preferred Embodiment

Next, referring to FIGS. 11 to 13, a third preferred embodiment applying the present invention is described below.

Figure 11:
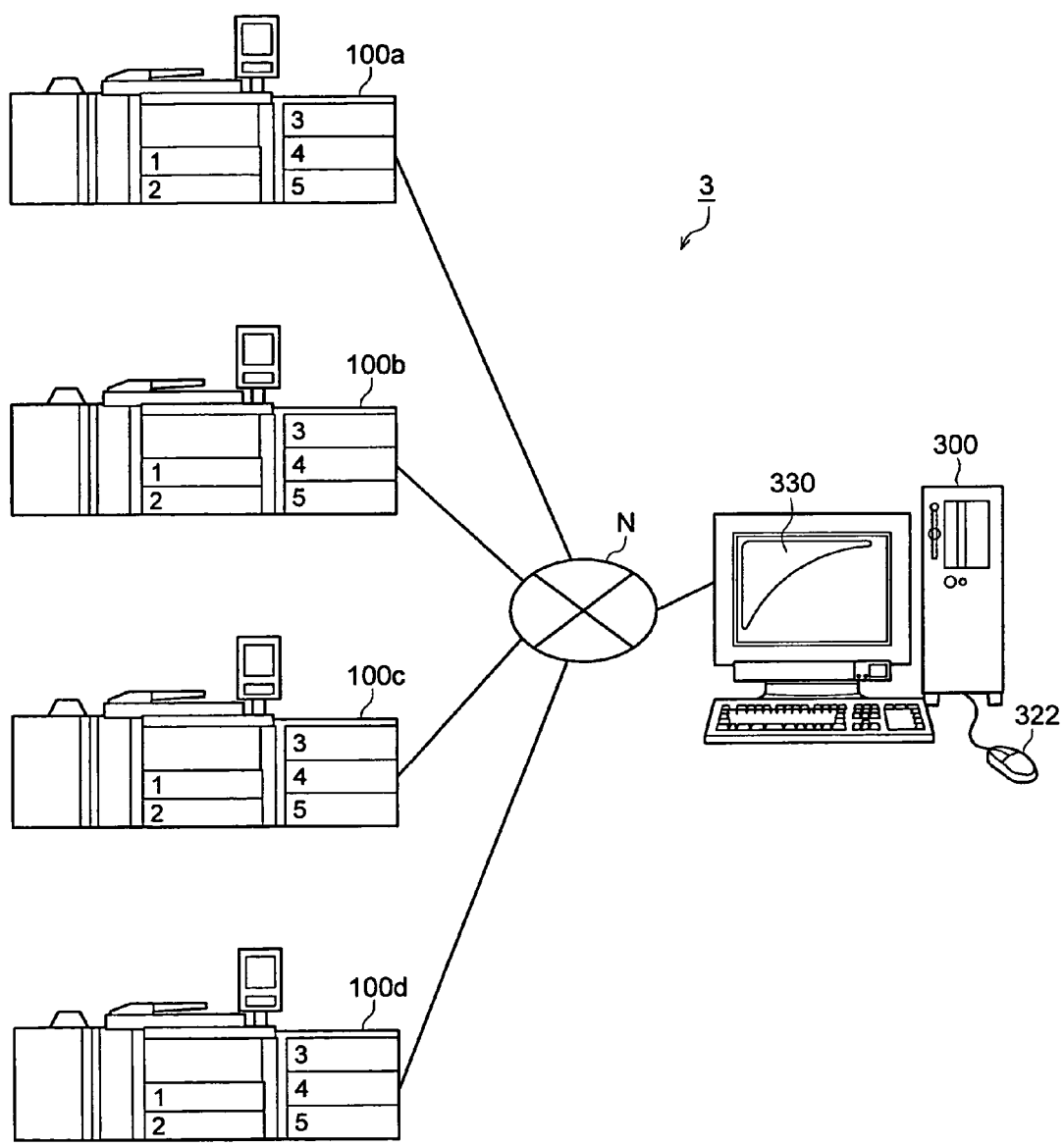
FIG. 11 is a system configuration diagram of the image forming system 3 according to a third preferred embodiment.
Figure 12:
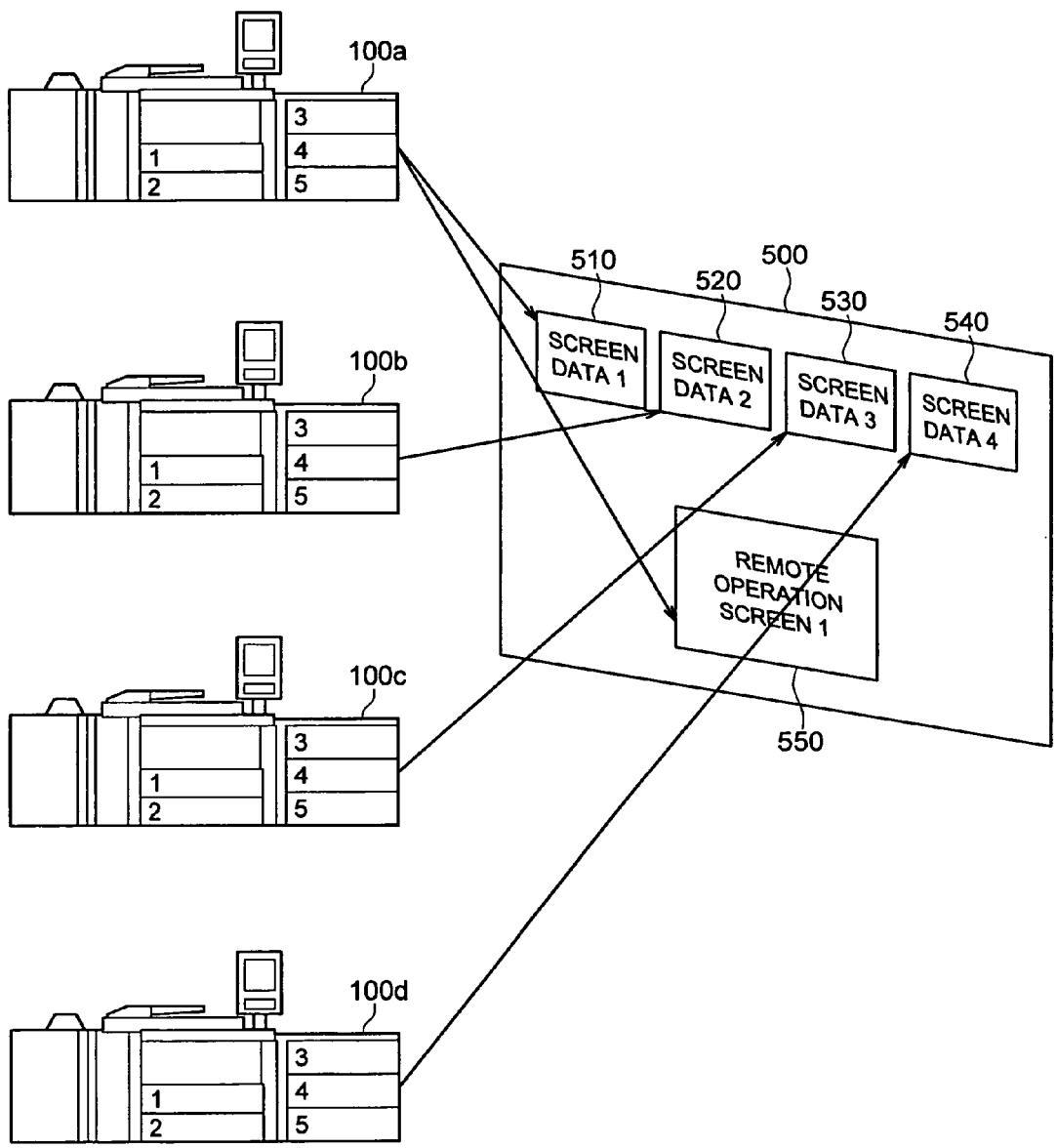
FIG. 12 is a diagram showing an example of a frame data 500.

FIG. 11 shows the system configuration of the image forming system 3 according to the third preferred embodiment. As has been shown in FIG. 11, the image forming system 3 has a configuration in which the copying machines 100a, 100b, 100c, and 100d, and the remote operation terminal 300 are connected via communication lines N so that they can communicate with each other.

Since the copying machines 100a, 100b, 100c, and 100d all have configurations that are similar to the configuration of the copying machine 100 described in the second preferred embodiment, like configuration parts have been assigned like numeric symbols with the letters a, b, c, and d suffixed to them, and their indication in the figure and their explanations have been omitted. In addition, since the remote operation terminal 300 has roughly been configured in the same manner as the remote operation terminal 300 shown in the second preferred embodiment, like configuration parts have been assigned like numeric symbols, and explanation of the configuration has been omitted here. In the following, the configuration parts and processing characteristic of the third preferred embodiment are described below.

In the image forming system 3, when any one of the copying machines 100a, 100b, 100c, and 100d is being operated remotely by the remote operation terminal 300, even regarding the copying machines other than the copying machine that is currently being the target of remote operation, the same screen is displayed in the remote operation terminal 300 as the screens displayed in the display sections 130a, 130b, 130c, and 130d of each of the copying machines 100a, 100b, 100c, and 100d.

The memory section 350 of the remote operation terminal 300 has stored in it the frame data to be displayed in the display section 330 at the time of remotely operating the copying machines 100a, 100b, 100c, and 100d. An example of the frame data 500 has been shown in FIG. 12. The URLs of the copying machines 100a, 100b, 100c, and 100d have each been entered in the frame data 500, and the controller 310 obtains the screen data respectively from the copying machines 100a, 100b, 100c, and 100d, and displays them in the display section 330 after carrying out resizing operation on each of them.

In the frame displayed based on the frame data 500 are provided the display screen area 510 that displays the same screen as the screen being displayed in the display section 130a of the copying machine 100a, the display screen area 520 that displays the same screen as the screen being displayed in the display section 130b of the copying machine 100b, the display screen area 530 that displays the same screen as the screen being displayed in the display section 130c of the copying machine 100c, the display screen area 540 that displays the same screen as the screen being displayed in the display section 130d of the copying machine 100d, and the remote operation screen area 550 that displays the remote operation screen of the copying machine being operated.

When the main operation screen is being displayed in the display section 130a of the copying machine 100a, the same screen as the main operation screen based on the main operation screen data 171a is displayed in the display screen area 510. When the alternate screen is being displayed in the display section. 130a of the copying machine 100a, the same screen as the alternate screen based on the alternate screen data 173a is displayed here. The same is true for the display screen area 520, the display screen area 530, and the display screen area 540.

When the copying machine 100a is the copying machine being operated remotely, the remote operation screen based on the remote operation screen data 172a is displayed in the remote operation screen area 550. By clicking the buttons in this remote operation screen, it is possible to transmit operation information to the copying machine 100a.

Figure 13:
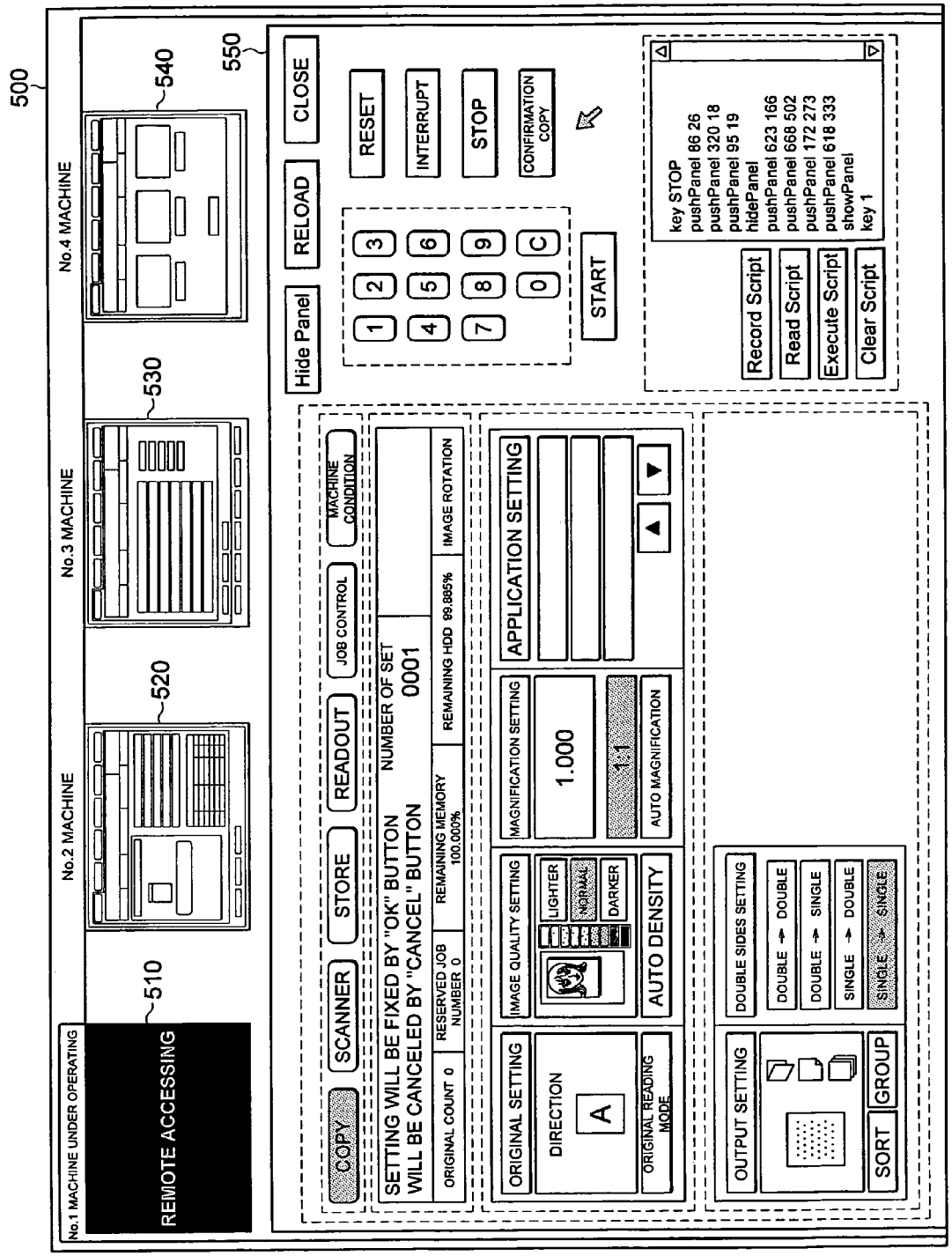
FIG. 13 is a diagram showing examples of the different operation states of a copying machine displayed in the display section 330 of the remote operation terminal 300.

FIG. 13 shows examples of the different operation states of the copying machines 100a, 100b, 100c, and 100d displayed in the display section 330 of the remote operation terminal 300. Here, remote operation is being made on the copying machine 100a, and the alternate screen is being displayed in the display section 130a of the copying machine 100a. Therefore, the remote operation screen for the copying machine 100a is displayed in the remote operation screen area 550, and the same screen as the alternate screen is displayed in the display screen area 510.

In this state, if a clicking operation is made in the display screen area 520, the target of operation becomes the copying machine 100b, and the remote operation screen corresponding to the copying machine 100b is displayed in the remote operation screen areas 550.

As has been explained so far, according to the image forming system 3 of the third preferred embodiment, it is possible to avoid displaying the operation screens in the copying machines 100a, 100b, 100c, and 100d during remote operation by displaying the alternate screens in the display sections 130a, 130b, 130c, and 130d of the copying machines 100a, 100b, 100c, and 100d. In addition, since it is possible to display in the remote operation terminal 300 the same display screen as the operation screen of the copying machine 100a, 100b, 100c, or 100d that is the target of operation, and since it is possible to display the same screen as the main operation screen or the alternate screen that is being displayed in the display sections 130a, 130b, 130c, and 130d of the copying machines 100a, 100b, 100c, and 100d, it is possible for the user to grasp the status of operation of each of the copying machines 100a, 100b, 100c, and 100d.

However, although in the third preferred embodiment the frame data was taken to be stored in the remote operation terminal 300, it is also possible to store the frame data in the copying machines. In that case, the remote operation terminal 300 first obtains the frame data stored in the copying machines, and then obtains the screen data at the URL destinations indicating each of the copying machines described in the frame data.

The descriptions in each of the above preferred embodiments are merely some examples of realization of the apparatus and operation terminals according to the present invention, and the present invention shall not be construed to be restricted to these examples given here. It is possible to modify appropriately the detailed configurations and the detailed operations of the different apparatuses without deviating from the scope of the present invention.

Figure 14:
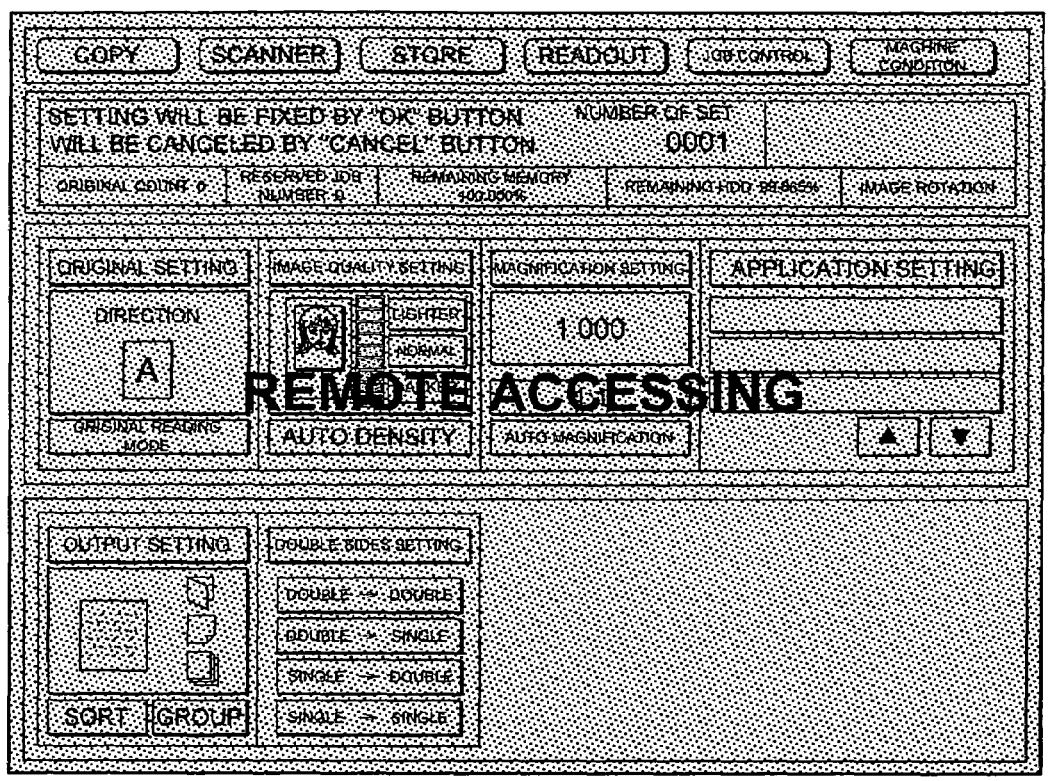
FIG. 14 is a diagram showing another example of an alternative screen.

For example, at the time of displaying the alternate screen in the display section 130 of the copying machine 100, as has been shown in FIG. 14, it is also possible to display the fact that a remote operation is being made while displaying the screen transitions associated with the operation information. Even in this case, it is desirable that the operation instructions from the operation section 120 are not accepted during the period that a remote operation is in progress.

Further, instead of displaying an alternate screen, it is also possible not to display the operation screen by turning off the display section 130. In addition, when a transmittance type LCD is applied as the display section, it is also possible resultantly not to display the operation screen by switching off the back light while carrying out the drive of the LCD based on the data of the operation screen.

Fourth Preferred Embodiment

Next, the image forming system in a fourth embodiment is explained below referring to FIG. 15 to FIG. 19. The image forming system according to the fourth preferred embodiment is similar to the image forming system 3 according to the third preferred embodiment in that the remote operation terminal 300 is connected via communication lines N to a plurality of copying machines 100a to 100d, and these plural copying machines can be monitored and operated remotely. However, the present preferred embodiment is different from the third preferred embodiment in that in this case, any one of the plurality of copying machines 100a to 100d (for example, the copying machine 100a) is accessed from the web browser of the remote operation terminal 300, the copying machine that is the target of display in the display section 330 of the remote operation terminal 300 corresponding to this copying machine is registered.

Figure 15:
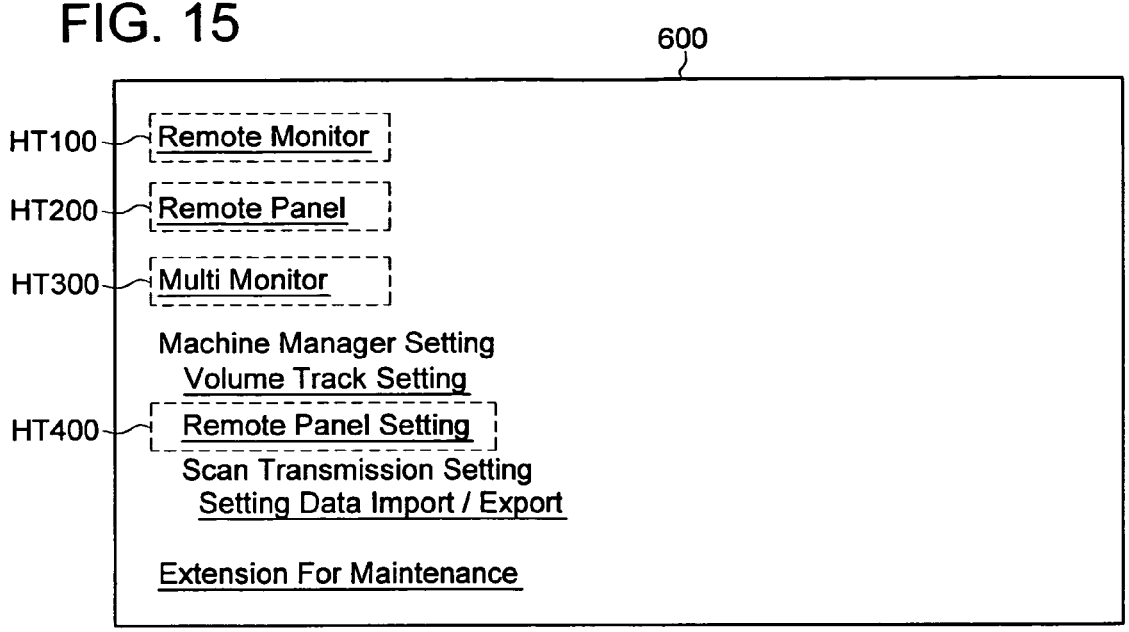
FIG. 15 is a diagram showing an example of web utility screen.
Figure 16:
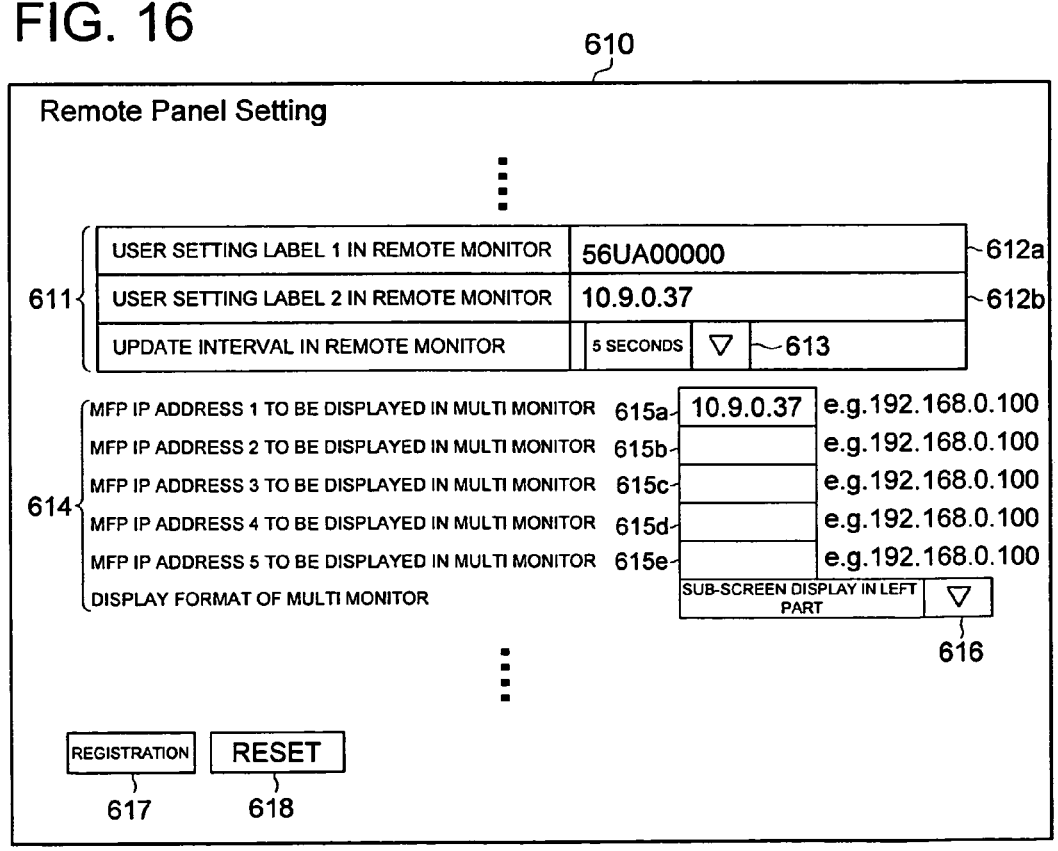
FIG. 16 is a diagram showing an example of Remote Panel Settings screen.

To begin with, when the copying machine 100a is accessed by specifying the IP address of the copying machine 100a in the web browser of the remote operation terminal 300, the copying machine 100a functions as a web server and returns to the web browser of the remote operation terminal 300 the web utility screen 600 shown in FIG. 15. In this web utility screen 600 are displayed a hypertext HT100 for linking to the Remote Monitor Screen for remotely monitoring the copying machine 100a that is currently being accessed, a hypertext HT200 for linking to the Remote Panel screen for remotely operating the copying machine 100a that is currently being accessed, a hypertext HT300 for linking to the Multi-Monitor Screen for remotely monitoring and operating the copying machine 100a that is currently being accessed and the other copying machines 100b to 100d that have been registered, and a hypertext HT400 for linking to the Remote Panel Settings Screen for carrying out various settings during remote operation, and other hypertexts.

In order to monitor and operate a plurality of copying machines from the remote operation terminal 300, the operation of registering the target copying machines is necessary, and various types of settings including this registration operation are made in the Remote Panel Settings screen. In other words, when the operator of the remote operation terminal 300 selects the hypertext HT400, the copying machine 100a returns the Remote Panel Settings screen 610 to the remote operation terminal 300, and that screen is displayed in the display section 330. In this screen are displayed—the user label field 611 for inputting the setting label as the individual information of the copying machine in the Remote Monitor screen or in the Multi-Monitor screen, the monitoring target registration field 614 for registering the IP address of the copying machine (MFP) for monitoring and operating in the Remote Monitor screen or in the Multi-Monitor screen, and the buttons 617, 618 etc., for registering or resetting the settings in that screen.

The user label field 611 includes the two input fields 612a and 612b for registering copying machine identification information (label) assigned to one or a plurality of copying machines displayed in the Remote Monitor screen or in the Multi-Monitor screen, and the pull down menu 613 for setting the time interval of updating the remote monitor, etc. Although the user can assign any arbitrary label to the copying machines, the serial number and the IP address of the copying machine would have been input beforehand as the initial setting in the input fields 612a and 612b.

The monitoring target registration field 614 includes five input fields 615a to 615e for registering the IP address of the copying machine (MFP) for monitoring and registering, and the pull down menu 616 for setting the display modes of the sub screens. The IP address of the copying machine 100a that is currently being accessed has been input as the initial value in the first input field 615a among the five input fields, and if there are any other copying machines that need to be monitored apart from this copying machine 100a, their IP addresses are to be entered and registered in the second and subsequent input fields. However, after a plurality of copying machines have been registered in the input fields 615a to 615e, if a Remote Monitor screen for remotely monitoring and operating a single copying machine has been selected from the web utility screen 600, the copying machine whose IP address has been registered in the first input field 615a will be monitored and operated.

When the setting and input in that Remote Panel Settings screen 610 have been completed and the user has clicked the Register button 617, the different settings input in that screen are transmitted to the copying machine 100a and registered there. The copying machine 100a, after storing the different settings in the memory section 170 which is a non-volatile memory (see FIG. 3 or FIG. 8), returns the web utility screen 600 to the remote operation terminal 300.

With the above operation, the registration of one or a plurality of copying machines to be monitored is completed. In the following explanations, the discussion is continued along the example in which the conditions shown in FIG. 17 have been set in the Remote Panel Settings screen 610.

The Multi-Monitor screen is displayed when the operator of the remote operation terminal 300 selects the hyper text HT300 from the web utility screen 600. In this Multi-Monitor screen, although the information of the copying machines 100a to 100d are displayed in accordance with the settings in the Remote Panel Settings screen 610, since their display mode is the same as the screen described in FIG. 12 and FIG. 13 excepting the items described below, repeated explanations will be omitted here.

In the Multi-Monitor screen of this example, the copying machine 100a that has been set in the input field of the IP Address 1 in the multi-monitor display of the Remote Panel Settings screen is not only displayed in the main screen area (corresponds to the remote operation screen area 550 in FIG. 13), but also the copying machines 100a to 100d set in the input fields of IP Address 1 to 4 are displayed in the sub screen area (corresponding to the display areas 510 to 540 in FIG. 13). In more concrete terms, the Multi-Monitor screen is reproduced in the display section 330 of the remote operation terminal 300 according to the following scheme.

Firstly, each of the copying machines 100a to 100d has a configuration in which the thumbnail image data obtained by reducing in size the remote operation screen data prepared based on the main operation screen data being displayed in the main operation screen of that copying machine itself and that remote operation screen data is stored in the memory section. In addition, each of the copying machines 100a to 100d has a configuration in which the status information of that copying machine, as shown in FIG. 18, as the table information of establishing correspondence between each status and the background color are stored in the memory section.

The copying machine 100a that is the target of access transmits html data specifying one main screen and four sub screens to the remote operation terminal 300. This html data includes the URL information of the remote operation screen data of the copying machine 100a to be displayed as an object in the main screen display area, the URL information of the thumbnail image data of the copying machine 100a to be displayed as an object in first sub screen display area and the URL information of the status information of the copying machine 100a that determines the background color of that sub screen display area, the URL information of the thumbnail image data of the copying machine 100b to be displayed as an object in second sub screen display area and the URL information of the status information of the copying machine 100b that determines the background color of that sub screen display area, the URL information of the thumbnail image data of the copying machine 100c to be displayed as an object in third sub screen display area and the URL information of the status information of the copying machine 100c that determines the background color of that sub screen display area, and the URL information of the thumbnail image data of the copying machine 100d to be displayed as an object in fourth sub screen display area and the URL information of the status information of the copying machine 100d that determines the background color of that sub screen display area. In addition, this html data includes the information of the background colors corresponding to the different types of statuses.

Figure 19:
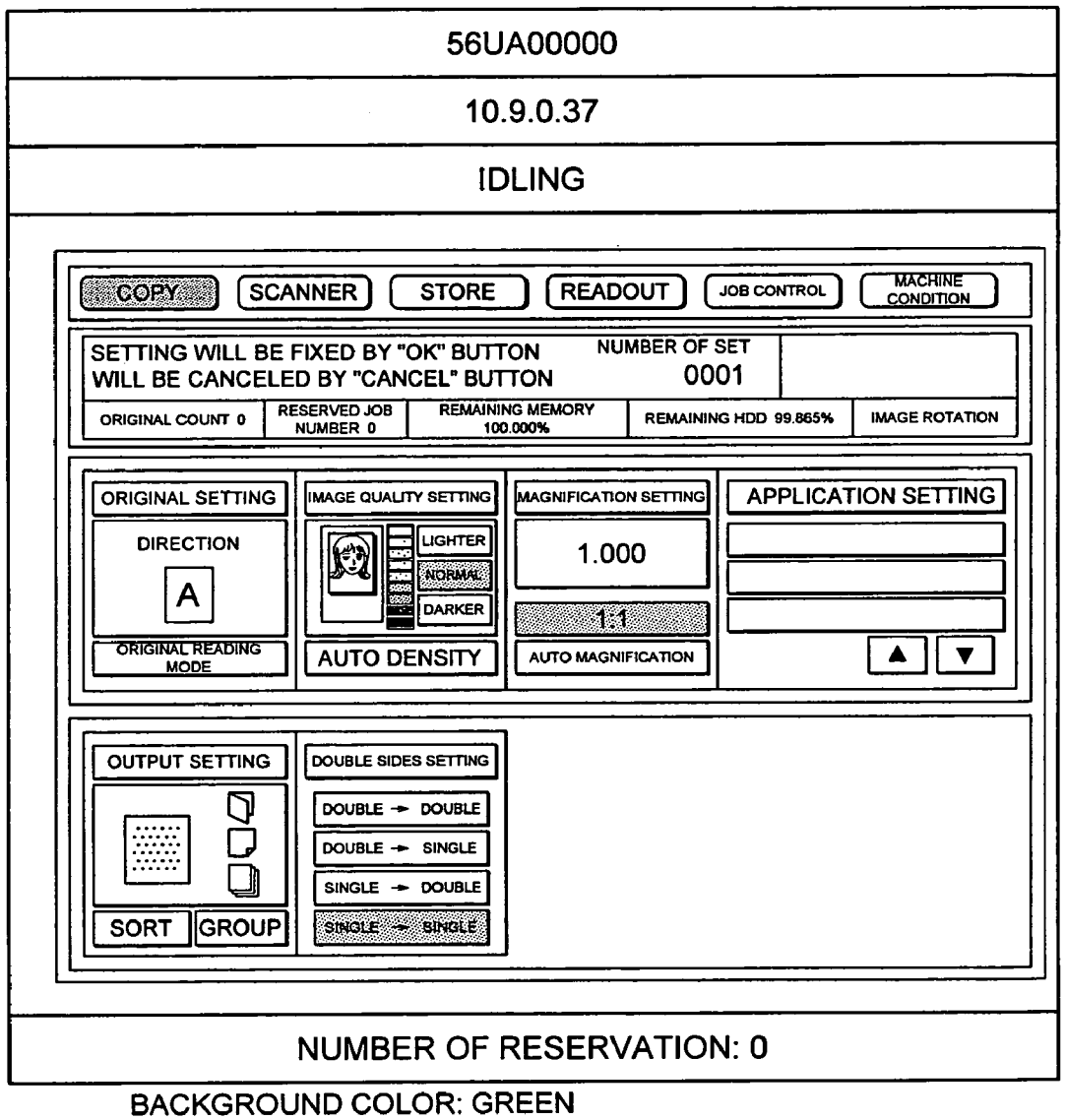
FIG. 19 is a diagram showing an example of the display in the first sub screen display area.

The remote operation terminal 300 that has received the above html data requests the copying machine 100a for the remote operation screen data, the thumbnail image data, and the status information, requests the copying machine 100b for the thumbnail image data and the status information, requests the copying machine 100c for the thumbnail image data and the status information, and requests the copying machine 100d for the thumbnail image data and the status information. When the data corresponding to the requests are received from the copying machines 100a to 100d, the remote operation terminal 300 not only reproduces the received image data in the main display area and in the sub screen display areas, but also displays the above Multi-Monitor screen in the display section 330 with the background colors in accordance with the status information of the copying machine corresponding to each sub screen display area. Although the screens displayed according to the above scheme are similar to those shown in FIG. 12 and FIG. 13, the display modes of the sub screen display areas are different from those shown in FIG. 12 and FIG. 13. FIG. 19 shows an example of the mode of display in the first sub screen display area. In FIG. 19, the five items of information of the serial number, status, thumbnail images of the operation screen, and the current reservation status of the copying machine 100a are being displayed sequentially from the top in the first sub screen display area, and the background color of the areas in which these five items of information are displayed has become green in accordance with the status (idling) of this copying machine 100a.

In the thumbnail image of the operation screen, a correspondence has been established with the link information to the remote operation screen data corresponding to that thumbnail image, and when the operator clicks this thumbnail image, this linked remote operation screen data is read out into and displayed in the main screen display area.

Further, according to the example of settings (FIG. 17) of the Remote Panel Settings screen 610 described above, the contents displayed in the main operation screen of the copying machine 100a are reproduced in the remote operation terminal 300 when the hyper text HT100 is selected in the web utility screen 600 described above. In this case, its display mode can be the same mode as that of the first sub screen display area of FIG. 19, or else, it is possible to change to the Remote Panel screen when the operator clicks the thumbnail image.

In the above fourth preferred embodiment, since the status of the copying machine that is the target of monitoring and operation from the remote operation terminal is being reproduced with a background color corresponding to that status, it is possible to grasp easily and visually the status of the target copying machine. In particular, when monitoring and operating a plurality of copying machines as in the Multi-Monitor screen in the fourth preferred embodiment, it is possible to reduce the load on the operator because the operator can grasp easily and visually the status of the target copying machine. Further, although the status of the monitor target copying machine is being expressed by color in the present preferred embodiment, in stead of this, it is also possible to assign different icons for different statuses (for example, a rain mark for paper jamming) and to express the status of each copying machine by an icon.

What is claimed is:

1. An image forming system comprising an image forming apparatus and an operation terminal configured to communicate with the image forming apparatus and remotely operate the image forming apparatus, wherein:
   the operation terminal comprises:
      a first display section configured to display a remote operation screen;
      a first display control section which controls the first display section based on remote operation screen data received from the image forming apparatus, for displaying a remote operation screen including content of a main operation screen of the image forming apparatus;
      an operation input section to input operation information for remotely operating the image forming apparatus; and
      a first transmission section which transmits the operation information inputted through the operation input section to the image forming apparatus;
   the image forming apparatus comprises:
      a second display section configured to display a main operation screen;
      a memory section which stores main operation screen data for displaying the main operation screen, alternate screen data for displaying an alternate screen different from the main operation screen, and remote operation screen data for displaying the remote operation screen including content of the main operation screen of the image forming apparatus;
      a control section which updates the main operation screen data based on the operation information received from the operation terminal to generate undated main operation screen data, and updates the remote operation screen data according to the undated main operation screen data to generate updated remote operation screen data;
      a second display control section which generates an undated main operation screen based on the undated main operation screen data, for displaying on the second display section; and
      a second transmission section which transmits the undated remote operation screen data to the operation terminal, for displaying the undated remote operation screen on the first display section;
   wherein the second display control section determines whether the undated main operation screen is a screen prohibited from display on the second display section;
   wherein, when the updated main operation screen is a screen prohibited from display on the second display section, the second display control section displays the alternate screen on the second display section based on the alternate screen data; and wherein, when the updated main operation screen is not a screen prohibited from display on the second display section, the second display control section displays an updated main operation screen on the second display section based on the updated main operation screen data.

2. The image forming system of claim 1, wherein:

the memory section comprises a plurality of memory banks, and stores the main operation screen data and the alternate screen data, respectively, in different memory banks; and the second display control section switches between displaying the main operation screen and the alternate screen by switching between the memory banks.

3. The image forming system of claim 1, wherein a screen is prohibited from being displayed on the second display section when the screen is a service mode screen.

4. The image forming system of claim 1, wherein the image forming apparatus comprises an operation section for operating the image forming apparatus in accordance with a main operation screen displayed on the second display section;

wherein, when the alternate screen is displayed on the second display section, an input from the operation section is prohibited.

5. The image forming system of claim 1, wherein the remote operation screen displays a plurality of buttons for manipulating settings of the image forming apparatus; and wherein the operation information transmitted from the first transmission section includes coordinate data relating to the remote operation screen.

6. The image forming system of claim 1, wherein the memory section further stores screen code data, and the second display control section determines whether the updated main operation screen is a screen prohibited from display on the second display section by referring to the screen code data.

7. An image forming apparatus configured to be remotely operated based on operation information received from an operation terminal, the image forming apparatus comprising:

a display section configured to display a main operation screen;

a memory section which stores main operation screen data for displaying the main operation screen, alternate screen data for displaying an alternate screen different from the main operation screen, and remote operation screen data for displaying a remote operation screen on the operation terminal, including content of the main operation screen of the image forming apparatus;

a control section which updates the main operation screen data based on operation information received from the operation terminal to generate updated main operation screen data, and updates the remote operation screen data according to the updated main operation screen data to generate updated remote operation screen data;

a display control section which generates an updated main operation screen based on the undated main operation screen data, for displaying on the display section; and a transmission section which transmits the updated remote operation screen data to the operation terminal, for displaying the updated remote operation screen on the display section of the operation terminal;

wherein the display control section determines whether the undated main operation screen is a screen prohibited from display on the display section; and wherein, when the undated main operation screen is a screen prohibited from display on the display section, the display control section displays the alternate screen on the display section based on the alternate screen data; and wherein, when the updated main operation screen is not a screen prohibited from display on the display section, the display control section displays an updated main operation screen on the display section based on the updated main operation screen data.

8. The image forming apparatus of claim 7, wherein the memory section comprises a plurality of memory banks, and stores the main operation screen data and the alternate screen data, respectively, in different memory banks; and the display control section switches between displaying the main operation screen and the alternate screen by switching between the memory banks.

9. The image forming apparatus of claim 7, wherein a screen is prohibited from being displayed on the display section when the screen is a service mode screen.

10. The image forming apparatus of claim 7, wherein the image forming apparatus comprises an operation section for operating the image forming apparatus in accordance with a main operation screen displayed on the display section;

wherein, when the alternate screen is displayed on the display section, an input from the operation section is prohibited.

11. The image forming system of claim 7, wherein the memory section further stores screen code data, and the display control section determines whether the updated main operation screen is a screen prohibited from display on the display section by referring to the screen code data.

* * * * *